United States Patent [19]

Kondou

[11] Patent Number: 5,149,922
[45] Date of Patent: Sep. 22, 1992

[54] ELEVATOR LOAD DETECTOR DEVICE USING MOVABLE DETECTOR PLATES

[75] Inventor: Tamaiti Kondou, Inazawa, Japan

[73] Assignee: Mitsubishi Denki Kabushiki Kaisha, Japan

[21] Appl. No.: 578,144

[22] Filed: Sep. 6, 1990

[30] Foreign Application Priority Data

| Sep. 8, 1989 | [JP] | Japan | 1-233742 |
| Sep. 13, 1989 | [JP] | Japan | 1-237681 |
| Sep. 13, 1989 | [JP] | Japan | 1-237684 |
| Dec. 4, 1989 | [JP] | Japan | 1-314996 |

[51] Int. Cl.[5] .................................. B66B 3/02
[52] U.S. Cl. .................................. 187/131
[58] Field of Search .................. 187/1 R, 131, 105; 177/45

[56] References Cited

U.S. PATENT DOCUMENTS

| 4,071,116 | 1/1978 | Halperin et al. | 187/131 |
| 4,078,623 | 3/1978 | Ohta et al. | 177/45 |
| 4,113,064 | 9/1978 | Shigeta et al. | 187/1 R |
| 4,460,066 | 7/1984 | Ohta | 187/105 |
| 4,766,977 | 8/1988 | Yamasaki | 187/20 |

FOREIGN PATENT DOCUMENTS 800627 8/1958 United Kingdom .
924276 4/1963 United Kingdom .

*Primary Examiner*—A. D. Pellinen
*Assistant Examiner*—Lawrence E. Colbert
*Attorney, Agent, or Firm*—Leydig, Voit & Mayer

[57] ABSTRACT

A load detector device for an elevator which detects the load of an elevator cage having rod-shaped anchoring members connected to ropes which suspend the cage. Each anchoring member having an associated elastic support member which elastically supports the anchoring member to an anchoring plate which is axially translatable. Activator members are provided, each surrounding an anchoring member and bearing at one end thereof on an annular seat fitted on the anchoring member, to extend axially translatably through the anchoring plate. Displacement of the ends of the activator members with respect to the anchoring plate is detected by a displacement detector thus facilitating determination of the cage load.

17 Claims, 21 Drawing Sheets

ELEVATOR LOAD DETECTOR DEVICE USING MOVABLE DETECTOR PLATES

BACKGROUND OF THE INVENTION

This invention relates a load detector device for an elevator, which detects the load on the elevator cages; this invention also relates to tension indicator devices for indicating the tensions of the main ropes by which the elevator cage is suspended in the hoist way.

FIGS. 1 and 2 show a load detector device for an elevator, disclosed, for example, in Japanese laid-open utility model No. 59-116361 or Japanese patent publicaion No. 39-16526. An elevator cage 1 is provided with an inverted U-shaped cross-sectional upper beam 1a, whose upper flat constitutes an anchoring plate 2 for the main ropes 4. The main ropes 4 are connected to the respective anchoring members, or shackle rods, 3, which extend through the anchoring plate 2. As shown in FIG. 2, elastic means 5, which comprises, for each anchoring member 3, a compression helical spring 5a fitted around the bottom end portion of an anchoring member 3 to bear upon the upper and lower spring seats 5b at both ends thereof, mounts the anchoring members 3 elastically to the anchoring plate 2, the elastic means 5 being disposed between the anchoring plate 2 and the nuts 6 screwed onto the threaded bottom end portion of the anchoring member 3.

Reference numeral 7 designates an activator member pivoted at an intermediate point thereof to the bottom surface of the upper beam 1a; the end portion of the activator member 7 situated to the side of the anchorinng members 3 is forked into support portions 7a, each opposing the bottom end of one of the anchoring member 3. Further, there is provided an urging member 7b consisting of a spring urging the activator member 7 so that the support portions 7a urge upward the bottom ends of the anchoring members 3. Reference numeral 8 designates a load detector consisting of a switch disposed on the bottom surface of the upper beam 1a to be activated by the rotation of the arms of the activator member 7.

One of the typical conventional rope anchoring devices for an elevator is constituted as described above. Thus, the cage 1 is suspended from the main ropes 4 via the anchroing members 3, the elastic means 5, and the upper beam 1a. When the load of the cage 1 increase, the elastic means 5 is compressed, and the anchoring members 3 move relatively upward with respect to the anchoring plate 2. As a result, the activator member 7 rotates, and, when the load of the cage exceeds a predetermined value, the laod detector 8 is activated. The activation of the load detector 8 triggers the necessary control of the elevator, such as that of the nonstop passing of floors due to the full capacity of the cage.

The load detector device of FIG. 2, however, has this problem: When the main ropes 4 are elongated with the passage of time, such temporal elongations of ropes are absorbed by the screwing-in of the nuts 6. In such case, the bottom ends of the anchoring members 3 are displaced with respect to the upper beam 1a to which the load detector 8 is mounted. Thus, each time the ropes 4 exhibit temporal elongations, the detector position of the load detector 8 should be adjusted anew.

By the way, the elevator devices for carrying freight and passengers are generally of the rope-type as the one described above. The rope-type elevator devices are further classified on the basis of the roping modes, such as 1:1 roping mode—as in the case described above——and 2:1 roping mode.

FIG. 3 shows another conventional 1:1 roping mode rope-type elevator device, which is similar to the one described above. An elevator cage 1 is supported within a cage frame which comprises: a pair of horizontal bottom frames 1i; a pair of vertial frames 1b fixed to the ends of the bottom frames 1i; and an upper beam 1a having a hat-shaped cross sectional form and spanning across the top ends of the pair of vertical frames 1b. Further, through the upper horizontal flat 2 of the upper beam 1a are formed a plurality of through-holes, through which shackle rods (anchoring members) 3 extend vertically to be vertically translatable therethrough. To the top ends of the shackle rods 3 are connected the main ropes 4 at one of the ends thereof, which ropes are wound around the sheave of the winding machine (not shown) in the machine room usually at the top of the hoist way of the elevator.

Incidentally, the projection lengths of the shackle rods 3 projecting from the upper surface 2 of the upper beam 1a can be adjusted by means of the nuts which are hidden within the upper beam 1a in FIG. 3.

On top of the front or entrance side of the cage 1 is attached a support member 1d having an inverted L-shaped cross sectional form. Spanned horizontally across the respective ends of the vertical side of the support member 1d and the pair of vertical frames 1b are connector members 1c. Further, stays 1h are spanned slantwise across the respective ends of the horizontal top flat of the suport member 1d and the respective ends of a side of the upper beam 1a. Furthermore, on the horizontal upper flat of the support member 1d is disposed a driving device 1j adjacent to a stay 1h; in addition, to the bottom edge of the vertical side of the support member 1d is fixed a rail 1k positioned directly above the entrance. Further, at the front bottom of the cage 1 is disposed a threshold 1f provided with a groove 1g positioned directly below the entrance. A rectangular door 1l is translatably fitted into the groove 1g and the rail 1k; the door 1l thus slides horizontally, being driven by the driving device 1j, so as to open and close the entrance. Thus, by means of the rotation of the sheave driven by the winding machine at the top of the hoist way, the plurality of the main ropes 4 are translated to move up and down the cage 1.

Next, the overall roping organization of the conventional 2:1 roping mode rope-type elevator device is described by reference to FIG. 4. Within a machine room 1n disposed at the top of the hoist way are disposed: a winding machine (not shown) provided with a sheave 1q; and a rotatable deflector wheel 1r positioned at the bottom side portion of the winding machine. Around the deflector wheel 1r and the sheave 1q are wound the main ropes 4, the respective ends of which extend through the holes through the floor 1p of the machine room 1n, to be suspended therefrom within the hoist way, respectively. Thus, one side of the main ropes 4 is wound around the pulley 1m of the cage 1 to be suspended from a side of the floor 1p via a buffer spring, etc.; the other side of the main ropes 4 is wound around the pulley 1t of the counterweight 1s to be suspended from the other side of the floor 1p via a buffer spring, etc.

Thus, when the sheave 1q rotates, the main ropes 4 are forwarded over the sheave 1q and the deflector wheel 1r, to effect a vertical translation of the cage 1 at ½ the speed of the main ropes 4.

By the way, generally speaking, the main ropes 4 are wound in parallel around the rope grooves of the sheave 1q, etc. If the elongations of the respective main ropes 4, and hence the tensions thereof, are not uniform, there arise inequalities among the respective loads born by the main ropes 4. This may result in frequent occurances of slips thereof with respect to the rope grooves of the sheave 1q, etc., which may generate failures occasioned by oscillations of the cage 1 or the abnormal abrasions of the main ropes 4.

Thus, it is necessary to adjust the tensions of the main ropes 4 to a uniform level. According to the conventional tension adjustment operations, as shown in Japanese published utility model No. 62-18610, the main ropes 4, each of which is given a predetermined tension, are cut to the same length, thereby securing the uniformity of the tensions of the main ropes 4.

However, in the initial state when the operation of the elevator device is started, the main ropes 4 are still new and thus are prone to be easily elongated under stress; in addition, they are under constant bending strains. As a result, the generation of a non-uniformity of the tensions of the main ropes 4 can hardly be avoided. Thus, in such a case, a spring-type balance is successively engaged by an operator, as shown in FIG. 3, with each one of the main ropes 4 and is pulled at right angles thereto (i.e., horizontally) so as to measure the tension thereof; on the basis of the measurements, the nuts are screwed or unscrewed, so as to adjust the projection lengths of the shackle rods 3. This adjustment operations, however, becomes very complicated when the number of the main ropes 4 is large; hence there arises the problem that the maintenance/inspection operations may suffer great delays.

Further, since the conventional tension adjustment operations have often been dependent on the operator's guess, non-uniformity of the tensions of the main ropes 4 has frequently been generated. Furthermore, in the case of the 2:1 roping mode rope-type elevator devices, there are a plurality of pulleys 1m and 1t between the two ends of the main ropes 4. Thus, a single adjustment operation is not sufficient for the complete tension adjustments of the whole length of the main ropes 4. Consequently, the tension adjustment operations should be repeated a number of times. Thus, the tension adjustment operations require a great deal of time and labor.

SUMMARY OF THE INVENTION

It is therefore an object of this invention to provide a load detector device for an elevator which is simple in structure and reliable in operation, wherein the operation of the load detector is not affected by the adjustments of the tension of the main ropes, which become necessary to absorb the temporal elongations of the main ropes.

A further object of this invention is to provide a load indicator device whereby the tension adjustment operations of the main ropes of the elevator can be simpliified and facilitated, and the uniformity of the adjusted tensions of the main ropes can be reliably enhanced.

The first mentioned object is accomplished according to the principle of this invention by a load detector device which comprises: rod-shaped anchoring members connected at one end thereof to the ropes and inserted at the other end thereof axially translatably through an anchoring plate; elastic support means for elastically supporting said anchoring members to said anchoring plate, said elastic support means including, for each one of the anchoring members, a resilient member bearing at one end thereof on the anchoring plate and at the other end thereof on an annular seat translatably fitted on the inserted end portion of the anchoring member, the axial translation of said annular seat away from the anchoring plate being limited by an adjustable fixing means axially adjustably fixed onto the inserted end of the anchoring member; activator members each bearing at one end thereof on said annular seat fitted on the anchoring member, to extend axially translatably through said anchoring plate; and detector means for detecting displacements, with respect to the anchoring plate, of the ends of the activator members opposite to the ends thereof bearing on said annular seats.

Preferably, the activator members each comprise a hollow cylindrical member axially translatably fitted around one of the rod-shaped anchoring members. It is also preferred that the load detector device further comprises a detector plate bearing on the ends of the activator members opposite to the ends thereof bearing on said annular seats to be translated with the activator members, such that the detector means detects a displacement of said detector plate with respect to the anchoring plate. Further, it is preferred that the detector means comprises: a differential transformer transducer fixedly mounted with respect to the anchoring plate, the output of the differential transformer transducer being modified by means of a translation of a magnetic shaft member thereof; and a wire rope means connected at one end thereof to the magnetic member of the differential transformer transducer and at the other end thereof to said detector plate, the wire rope transmitting the displacement of the detector plate to the magnetic member of the differential transformer transducer.

On the other hand, the second mentioned object of this invention is accomplished according to the principle of this invention by a load indicator device which comprises: rod-shaped anchoring members connected at one end thereof to the ropes and inserted at the other end thereof axially translatably through an anchoring plate; elastic support means for elastically supporting said anchoring members to said anchoring plate, said elastic means including, for each one of the anchoring members, a resilient member bearing at one end thereof on the anchoring and at the other end thereof on an annular seat translatably fitted on the inserted end portion of the anchoring member, the axial translation of said annular seat directed away from the anchoring plate being limited by an adjustable fixing means axially adjustably fixed onto the inserted end of the anchoring member; activator members each bearing at one end thereof on said annular seat fitted on the anchoring member, to extend axially translatably through said anchoring plate; and indication means for indicating displacements, with respect to the anchoring plate, of the ends of the activator members opposite to the ends thereof bearing on said annular seats.

Preferably, the indication means comprises marks each formed on the outer circumferential surface of one of the activator members so as to indicate separations thereof from the anchoring plate. Further, it is preferred that each activator member is preferred to consist of a hollow cylindrical detector cylinder.

BRIEF DESCRIPTION OF THE DRAWINGS

The novel features which are believed to be characteristic of this invention are set forth with particularity in the appended claims. This invention itself, however, both as to its organization and method of operation, together with further objects and advantages thereof, may best be understood by referring to the following detailed description of the preferred embodiments, taken in connection with the accompanying drawings, in which:

In the drawings, like reference numerals represent like or corresponding parts or portions.

DETAILED DESCRIPTION OF THE PREFERRED EMBODIMENTS

Figure 1:
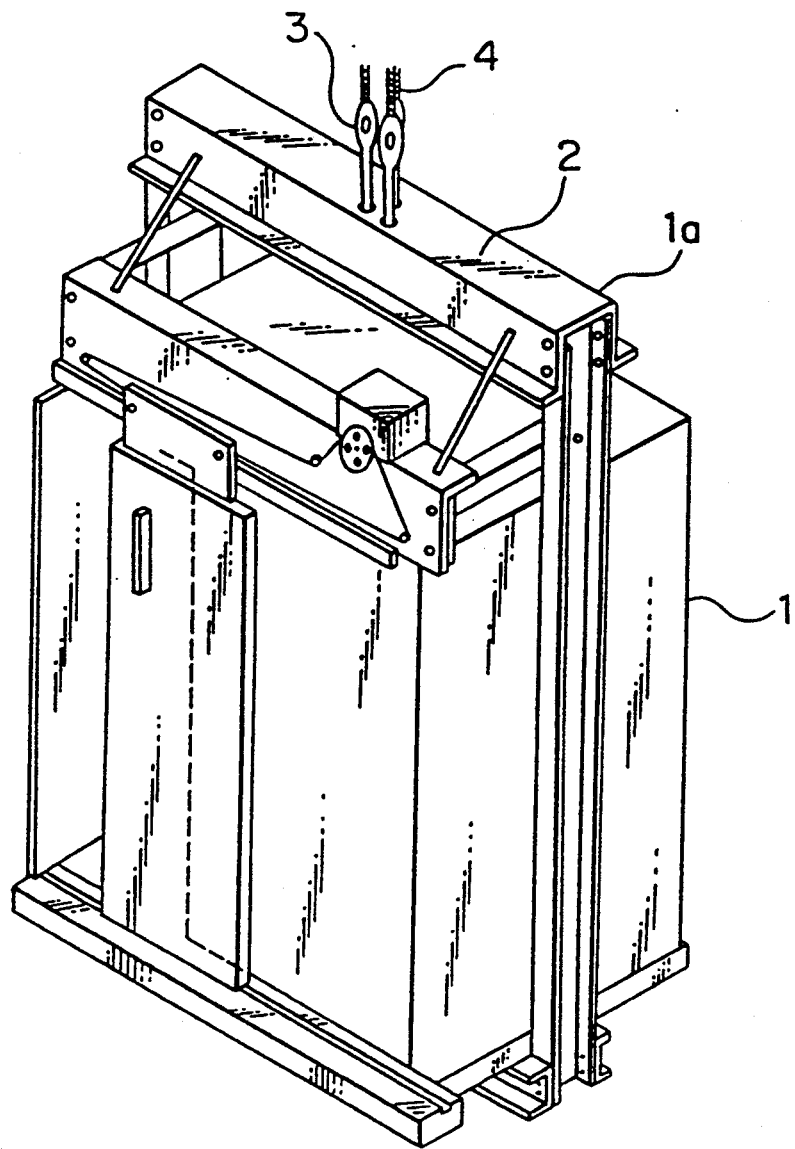
FIG. 1 is a perspective view schematically showing a cage of an elevator which is suspended in a hoist way by means of main ropes.
Figure 2:
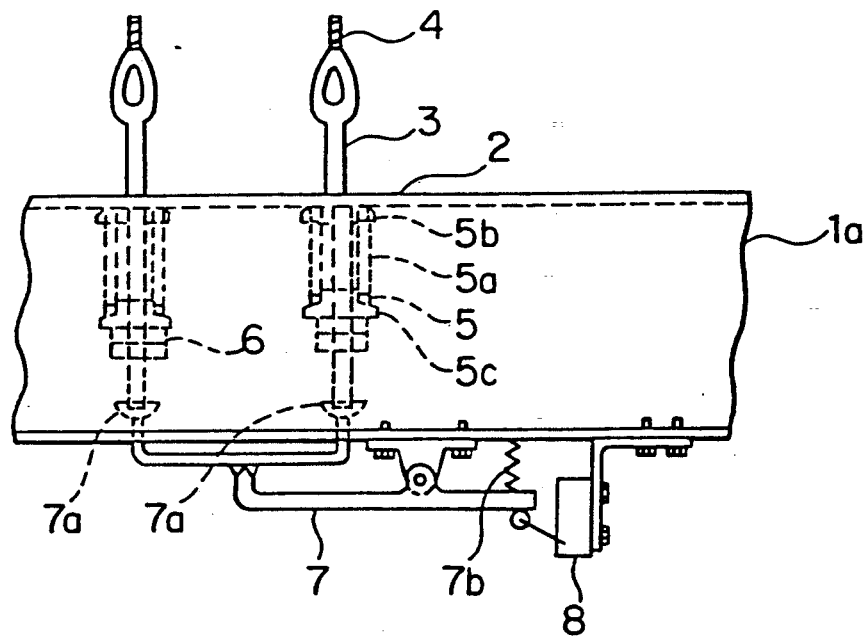
FIG. 2 is an enlarged front view of the essential portion at the upper beam of FIG. 1, showing a conventional load detector device for an elevator.
Figure 4:
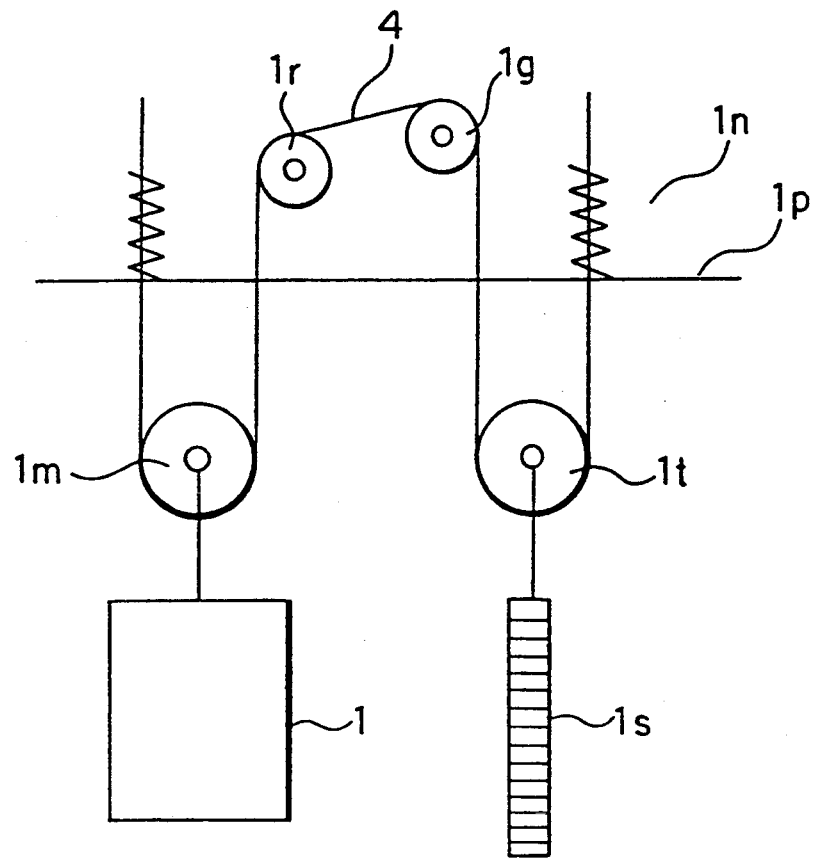
FIG. 4 is a schematic view showing the roping organization of 2:1 roping mode elevator device.
Figure 5:
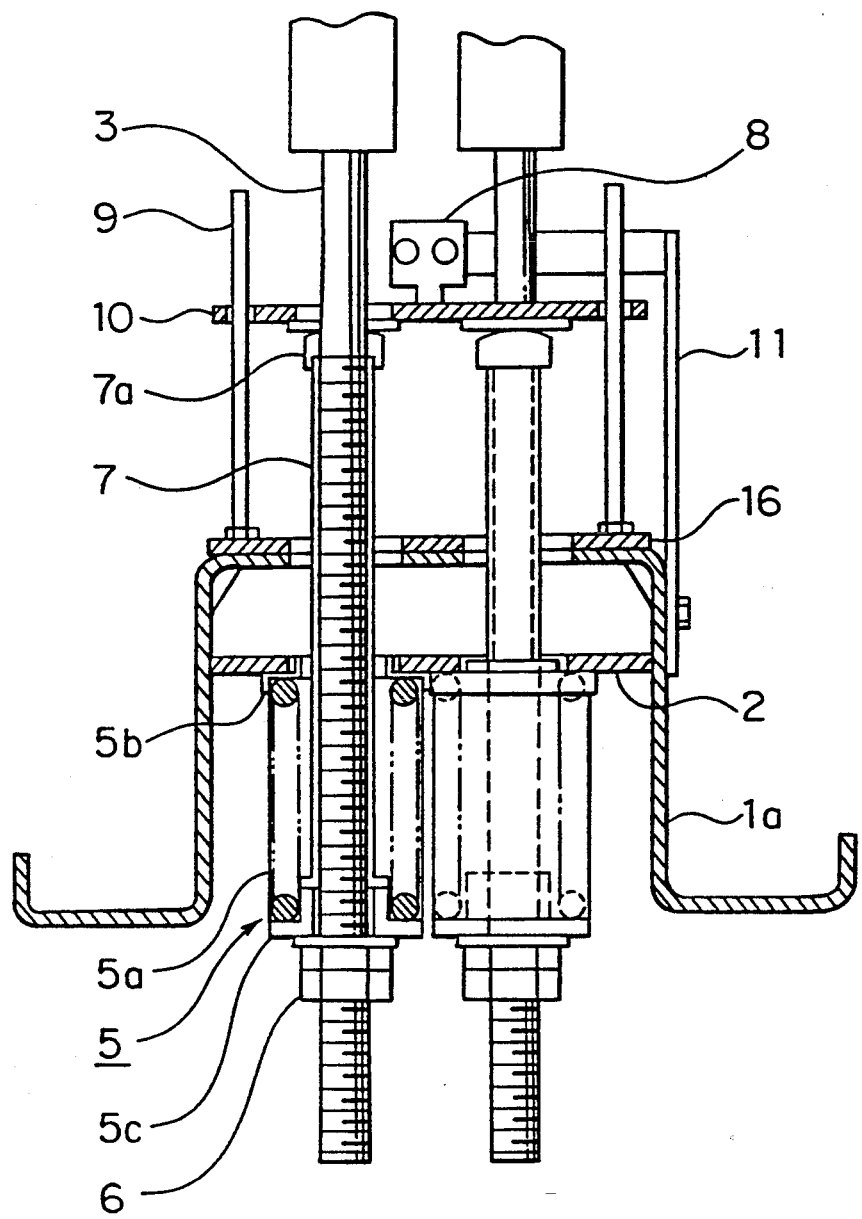
FIG. 5 is a view of an embodiment of the load detector device for an elevator according to this invention, showing an enlarged front-to-back vertical sectional view of the upper beam portion of an elevator cage to which the main ropes are anchored.
Figure 6:
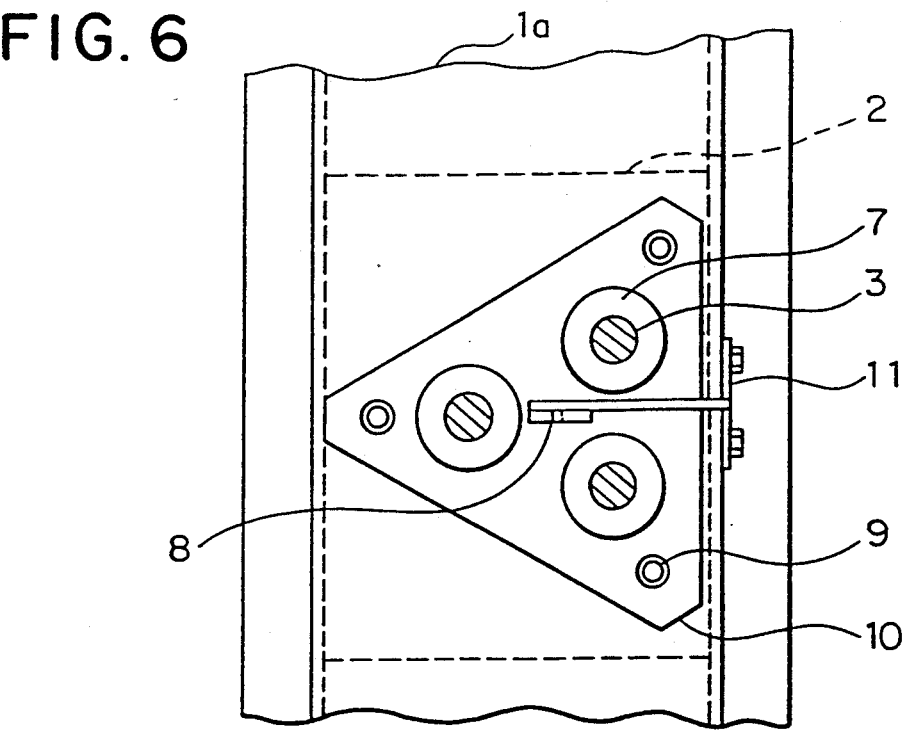
FIG. 6 is a cross sectional plan view of the essential portion of FIG. 5.

FIGS. 5 and 6 show an embodiment of this invention; in these figures, reference numerals occurring in FIGS. 1 and 2 designate the corresponding parts. Further, it is noted that the overall structure of the elevator cage to which the upper beam of FIGS. 5 and 6 is attached is similar to that shown in FIG. 1 or 3.

Figure 3:
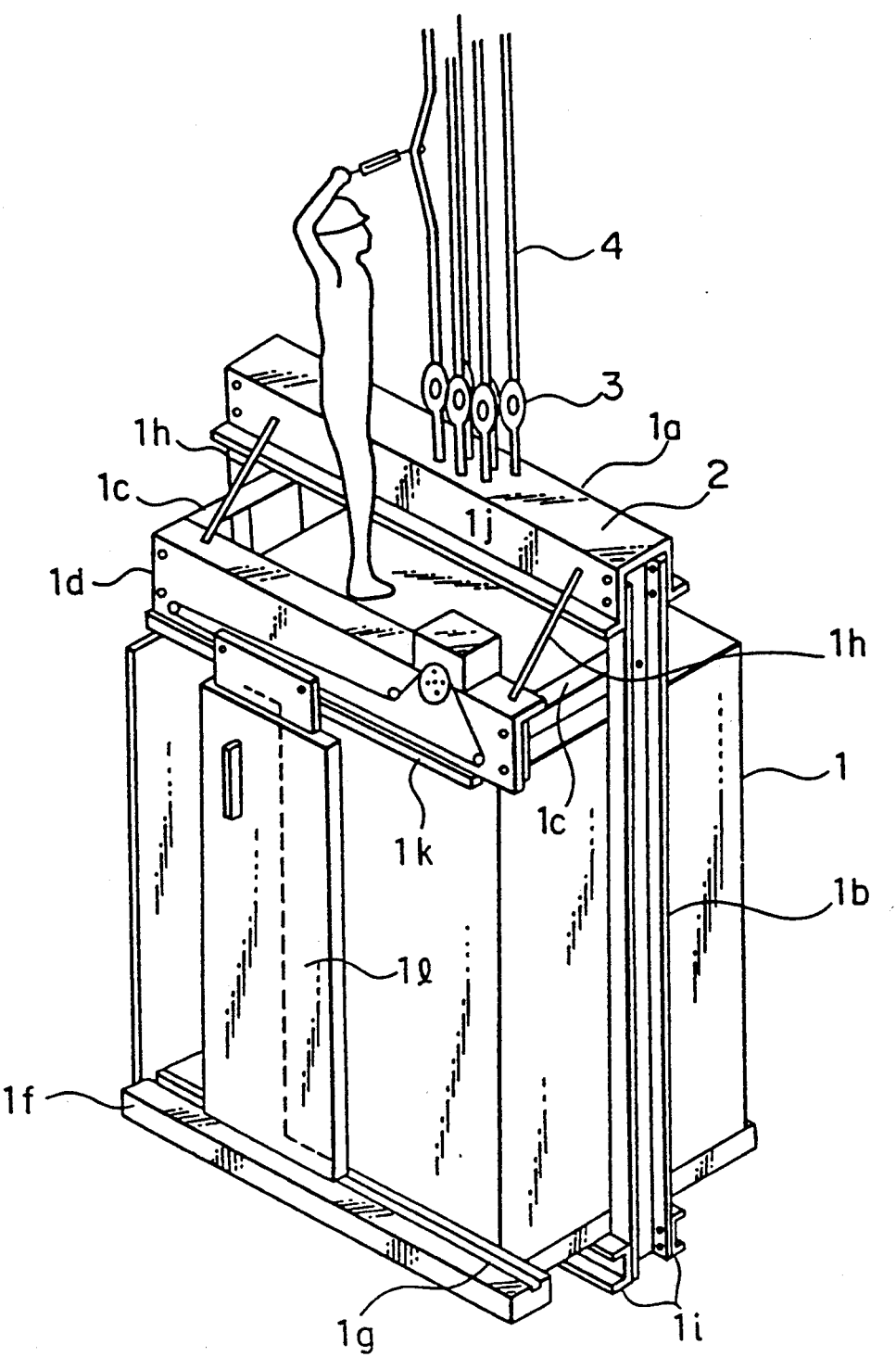
FIG. 3 is a perspective view similar to that of FIG. 1, showing another cage similar to that of FIG. 1.

In FIGS. 5 and 6, a hat-shaped cross-sectional upper beam $1a$, attached on top of a box-shaped elevator cage as shown in FIG. 1 or 3, has an anchoring plate 2 spanning horizontally across the interior side walls thereof. The elevator cage is suspended from the main ropes via the rod-shaped anchoring members 3 (see also FIG. 1 or 3) via the elastic support means 5 bearing on the anchoring plate 2, which elastic support means elastically supports the elevator cage on the anchoring members 3 via the anchoring plate 2. The elasitc support means 5 comprises, for each one of the anchoring members 3, a helical compression spring $5a$, a top annular spring seat $5b$ fixed to the anchoring plate 2, and a bottom annular spring seat $5c$ axially translatably fitted on the inserted end portion of the anchoring member to be supported by the nuts 6 screwed onto the bottom threaded portion of the anchoring member 3. As shown in FIG. 3, the three anchoring members 3 are dispsoed at the three corners of a triangle.

Activator members 7 each consist of a tubular body, or a hollow cylindrical member, having a spherical seat $7a$ at the top end thereof. One activator member 7 is provided for each one of the anchoring members 3, to be fitted axially translatably therearound, so that each one of the activator members 7 extends axially translatably through the upper beam $1a$, the anchoring plate 2, the top spring seat $5b$ and the helical compression spring $5a$, to abut at the bottom end thereof on the upper end surface of the bottom spring seat $5c$. Guide rods 9 are erected on a plate 16 (having through holes formed therethrough in axial registry with those formed through the top flat of the upper beam $1a$) attached on top of the upper surface of the upper beam $1a$ at the three corners of a triangle surroundg that of the anchoring members 7 (see FIG. 6). A triangular activator plate (detector plate) 10, through which the anchoring members 3 and the guide rods 9 axially translatably extend, bears from above on the spherical seats $7a$ of the activator members 7. An inverted L-shaped bracket 11 fixed to an outer side of the upper beam $1a$ at the bottom end thereorf has a load detector 8 mounted at the top front end thereof. The detector 8 consists of a switch having an activation portion which is in contact with the upper surface of the activator plate 10.

Thus, the load detector 8 of FIGS. 5 and 6 detects the load of the elevator cage as follows: The compressions of the elastic support means 5 resulting from the load of the cage are transmitted to the load detector 8 via the activator plate (detector plate) 10 by means of the displacements of the activator members 7 with respect to the anchoring plate 2. Namely, when the anchoring members 3 move upward together with the nuts 6 fixed thereon, the bottom spring seats 5c, the activator members 7, and the activator plate (detector plate) 10 are translated simultaneously upward with the anchoring members 3, wherein the load detector 8 detect the relative displacement of the activator plate (detector plate) 10 with respect to the anchoring plate 2. It is noted that in the case of this embodiment, the average deflection or compression of the helical springs 5a of the elastic support means 5 for the three anchoring members 3 as shown in FIG. 6 is transmitted to the load detector 8.

As shown in FIGS. 5 and 6, the spherical seats 7a of activator members 7, the load detector 8, etc., are disposed to the side of the anchoring plate 2 to which the main ropes are disposed. Namely, the load detector 8 detects the displacements of the ends of the activator members 7 opposite to the ends thereof bearing on the bottom spring seat 5c. Further, the activator members 7 are slidable on the anchoring members 3 to bear on the bottom spring seats 5c irrespective of the position of the nuts 6 on the male threaded portions of the anchoring members 3. Thus, even if the nuts 6 are operated (i.e., turned to be moved axially on the anchoring members 3) for the purpose of adjusting the temporal elongations of the main ropes or for the purpose of the exchange of the ropes 4, the operations of the load detector 8 is not affected; hence the number of the steps of the maintenance operations can be reduced. Further, since the parts such as the load detector 8, etc., are mounted above the upper beam 1a, the space between the ceiling of the elevator cage and the upper beam 1a thereof is rendered wider. This is convenient for the emergency rescue operations for the passengers confined within the cage. Still further, since the height of the frame of the cage can be rendered small, a wider top clearance can be secured in the hoist way (not shown). Furthermore, since the load detector 8, etc., are disposed in the open space above the upper beam 1a, the mounting or the maintenance operations of the load detector device can be effected easily.

Figure 7:
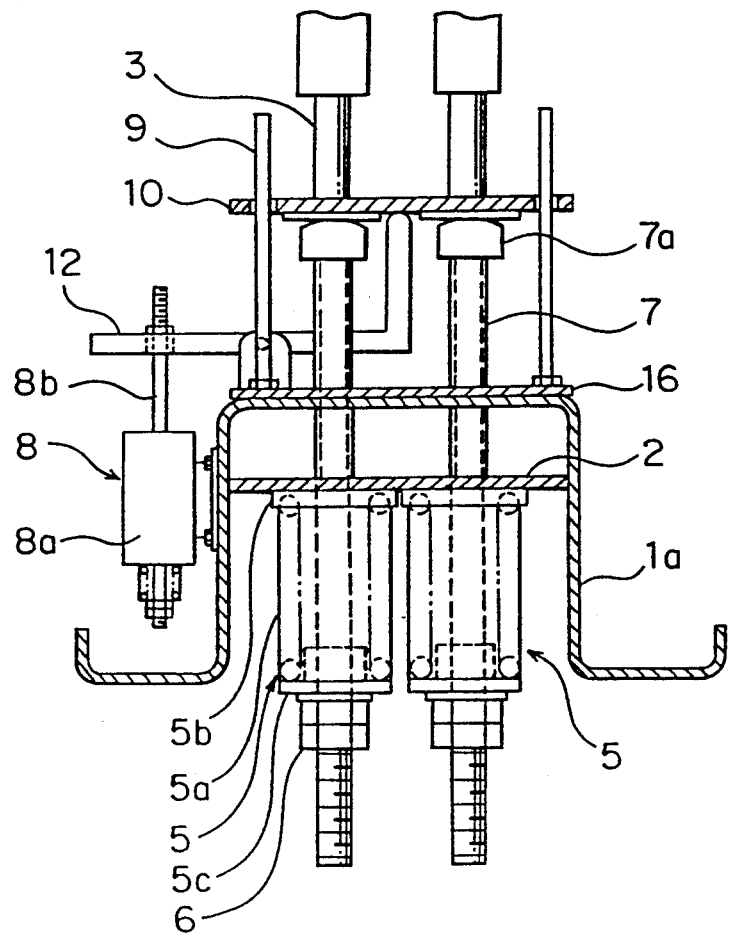
FIG. 7 is a view similar to that of FIG. 5, but showing another embodiment of the load detector device for an elevator according to this invention.
Figure 8:
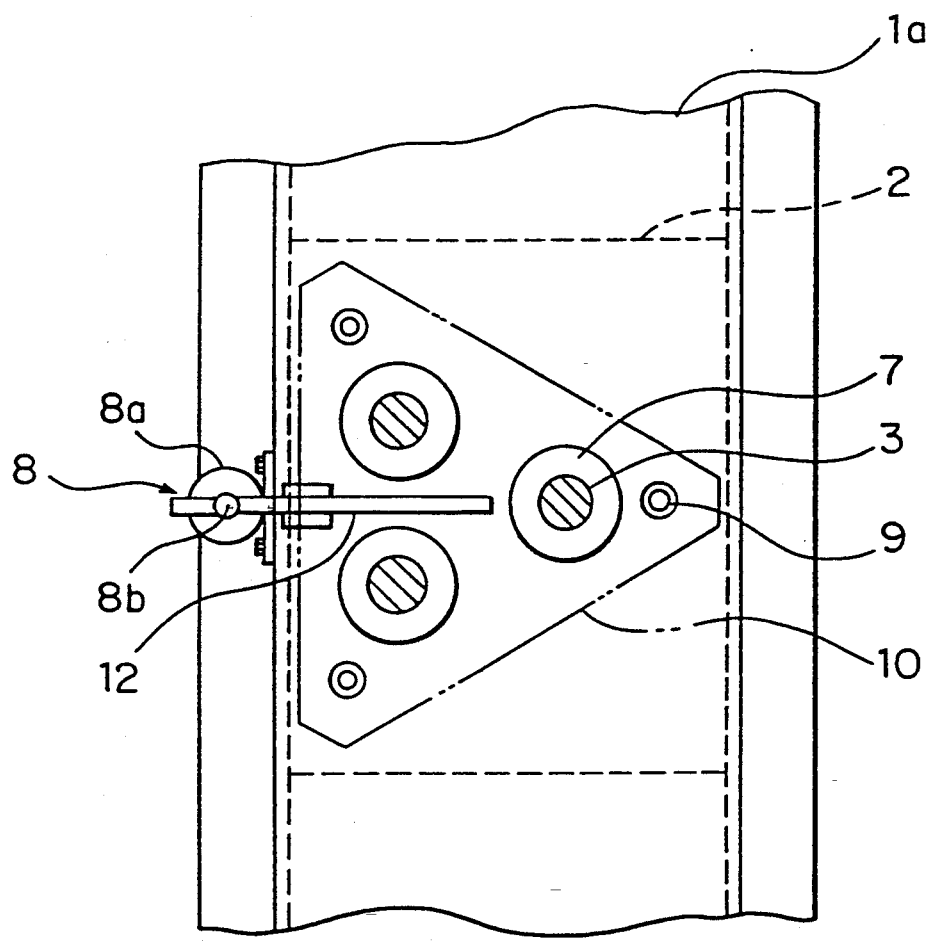
FIG. 8 is a cross sectional plan view of the essential portions of FIG. 7.

FIGS. 7 and 8 show another embodiment of this invention similar to that of FIGS. 5 and 6, wherein reference numerals occurring in FIGS. 5 and 6 represent the corresponding parts in FIGS. 7 and 8. In the case of this embodiment, a load detector 8 consists of a differential transformer transducer, which is attached to a side of the upper beam 1a. An L-shaped activator lever 12 is pivoted at an intermediate portion thereof to the top surface of the upper beam 1a, wherein one end of the lever 12 is connected to the magnetic shaft member 8b mounted axially translatably within the main body 8a of the differential transformer (load detector) 8, the other end thereof being in contact with the lower surface of the activator plate 10. Otherwise, the organization of this embodiment is similar to that of FIGS. 5 and 6. Thus, the relative displacements of the activator members 7 with respect to the anchoring plate 2 are transmitted to the load detector 8 via the detector plate (activator plate) 10 and the activator lever 12. Although detailed description is omitted, it is evident that functional operations are similar to those of the embodiment of FIGS. 5 and 6.

Figure 9:
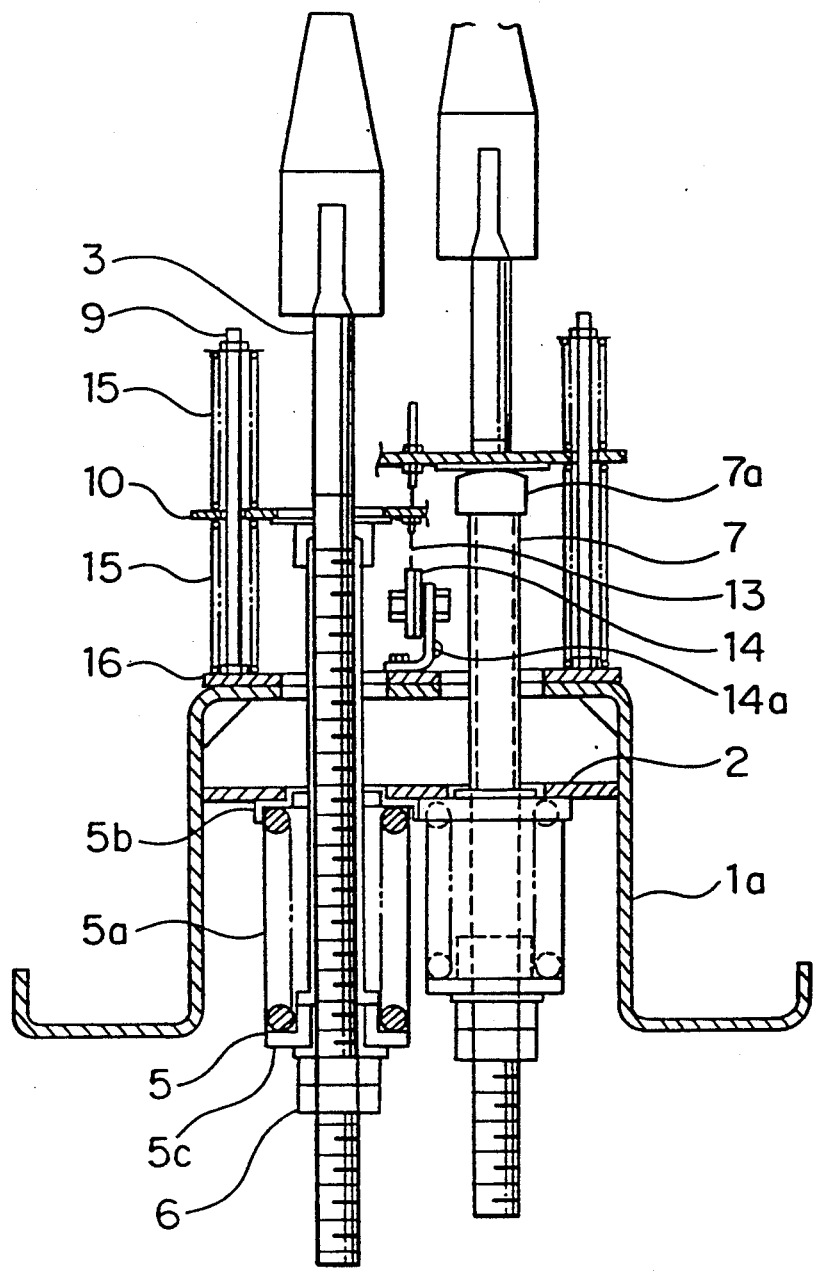
FIG. 9 is a view similar to that of FIG. 5, showing another embodiment of this invention, wherein the right half shows the state under a heavy load, the left half the state under a light load.
Figure 10:
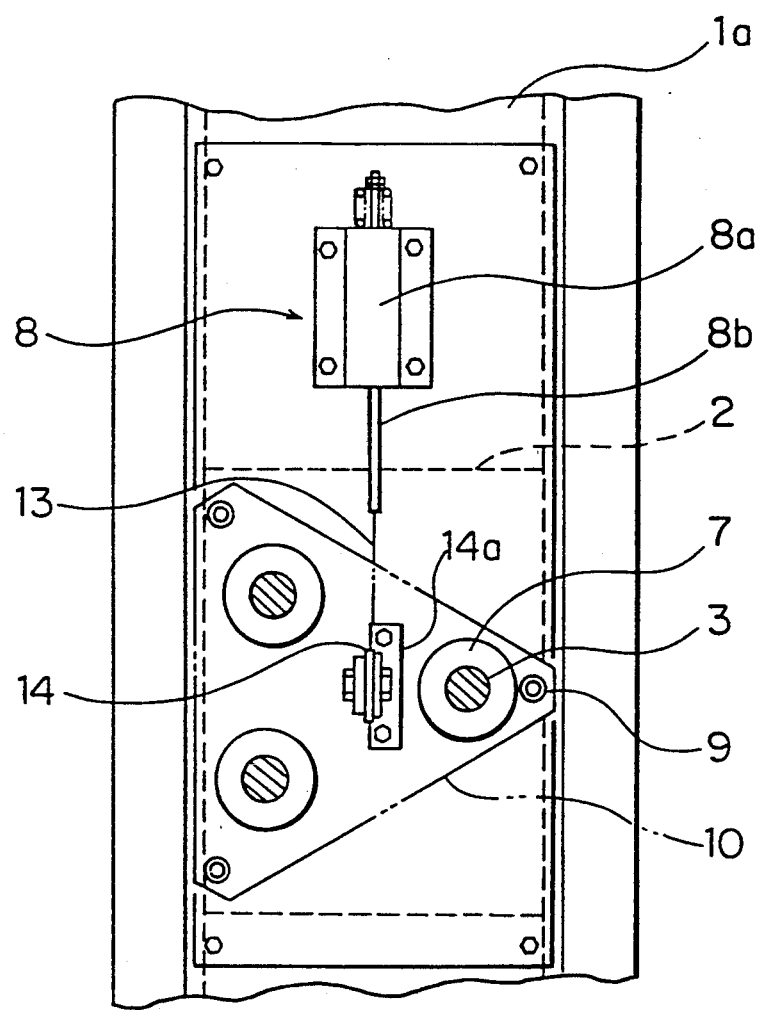
FIG. 10 is a cross sectional plan view of the essential portions of FIG. 9.
Figure 11:
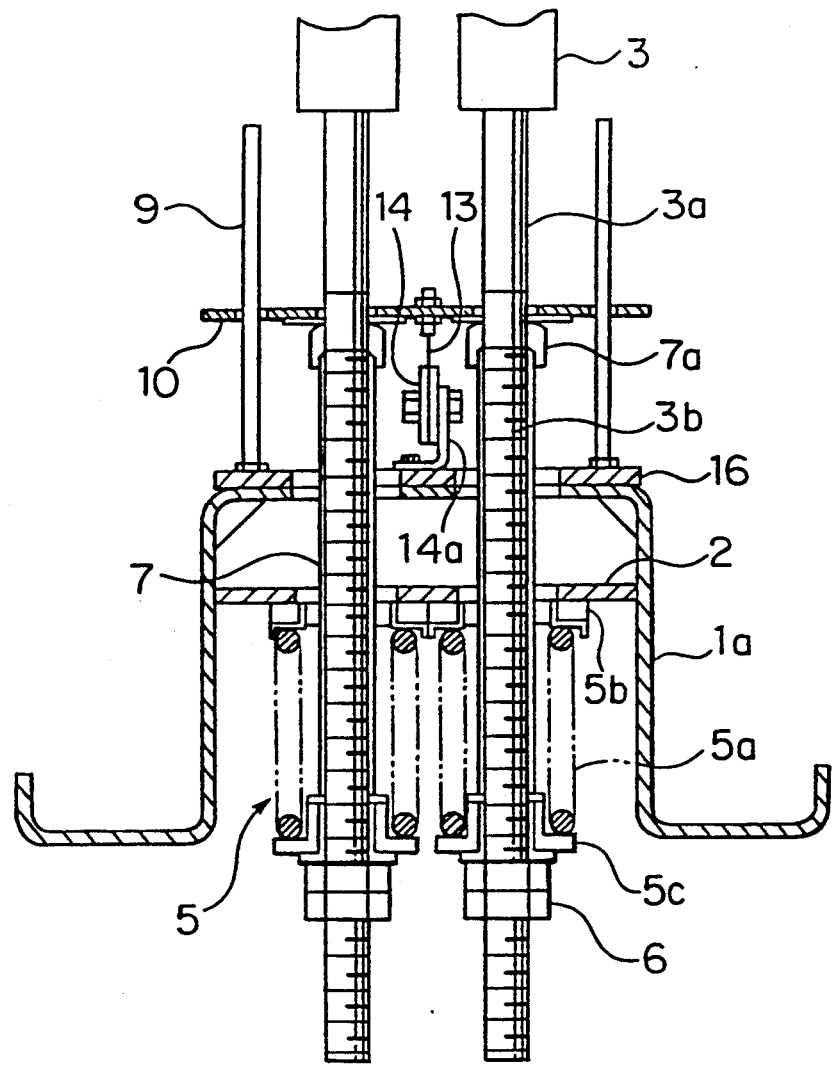
FIG. 11 is a view similar to that of FIG. 9, but showing another load detector device which comprises a pair of detector plates.

FIGS. 9 and 10 show another embodiment of this invention, wherein like reference numerals occurring in FIGS. 5 and 6 designate corresponding parts. In FIG. 9 the right and the left halves of the figure show the device under the heavy and the light load conditions, respectively. A load detector 8 consisting of a differential transformer transducer is attached to the plate 16 fixed on top of the upper beam 1a. An activation wire (wire rope) 13, having one end connected to the shaft of load detector 8 and the other end connected to the center of the activator plate 10, is deflected, at the intermediate portion thereof, by the pulley or deflector wheel 14 rotatably mounted to the upper beam 1a via a support member 14a. Pressor springs 15 are fitted around the guide rods 9 both above and below the activator plate (detector plate) 10, respectively, so as to ensure that the activator plate 10 is constantly in elastic contact with the top spherical seats 7a of the activator members 7. The movement of the activator plate 10, caused by the displacedments of the activator members 7, are transmitted to the magnetic shaft member 8b mounted translatably within the main body 8a of the differential transformer (load detector) 8 via the activation wire (wire rope) 13. Thus, although detailed description is omitted, it is evident that functional operations are obtained that are similar to those obtained by the embodiment of FIGS. 5 and 6.

FIGS. 11 through 14 show another form of a load detector device for an elevator which is similar to that of FIGS. 9 and 10, except that the number of the main ropes and the anchoring members is six instead of three, and two detector plates are provided instead of one. As in the case of the above embodiments, anchoring plate 2 spans horizontally across the opposing interior walls of the upper beam 1a of the elevator cage. A plate 16 is attached on top of the upper beam 1a. Through this plate 16, the top flat of the upper beam 1a, and the attachemnt plate 2 there are formed six through-holes, respectively, in axial registry; the six through-holes formed through the plate 16, etc., are divided into two groups of three, each group of three forming a triangle (see FIG. 12). Six rod-shaped shackles (anchoring members) 3 are inserted vertically through the six through-holes, respectively, to be vertically translatable therethrough. Each shackle 3 comprises: a main portion 3a connected respectively to the plurailty of main ropes (see also FIG. 1 or 3); and a bottom male threaded portion 3b extending through the plate 16, the upper flat of the upper beam 1a, and the anchoring plate 2. A hollow cylindrical activator members 7 each having top spherical seats 7a are fitted around the shackles 3 (see FIG. 11).

The threaded portion of the shackles 3b extend through the top and bottom spring seats 5b and 5c. Between the top and bottom spring seats 5b and 5c are disposed respective helical springs 5a, which urge back to the original positions the shackles 3 that have been moved relatively upward. Double nuts 6 are screwed onto the threaded portion 3b of the shackles 3. The bottom spring seats 5c are fixed to the shackle pipes 3b by means of the double nuts 6 (see FIG. 11).

Figure 12:
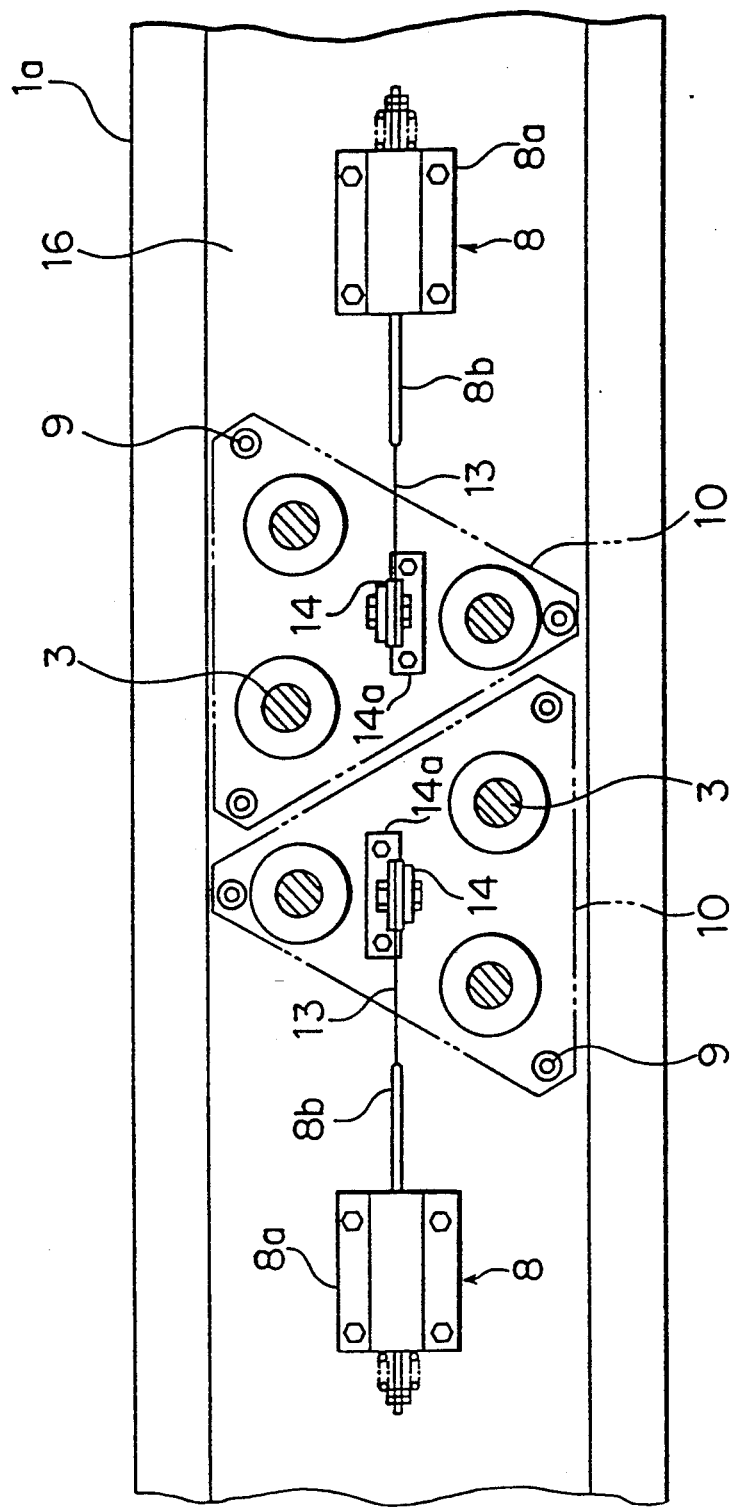
FIG. 12 is a plan view of the load detector device of FIG. 11.
Figure 13:
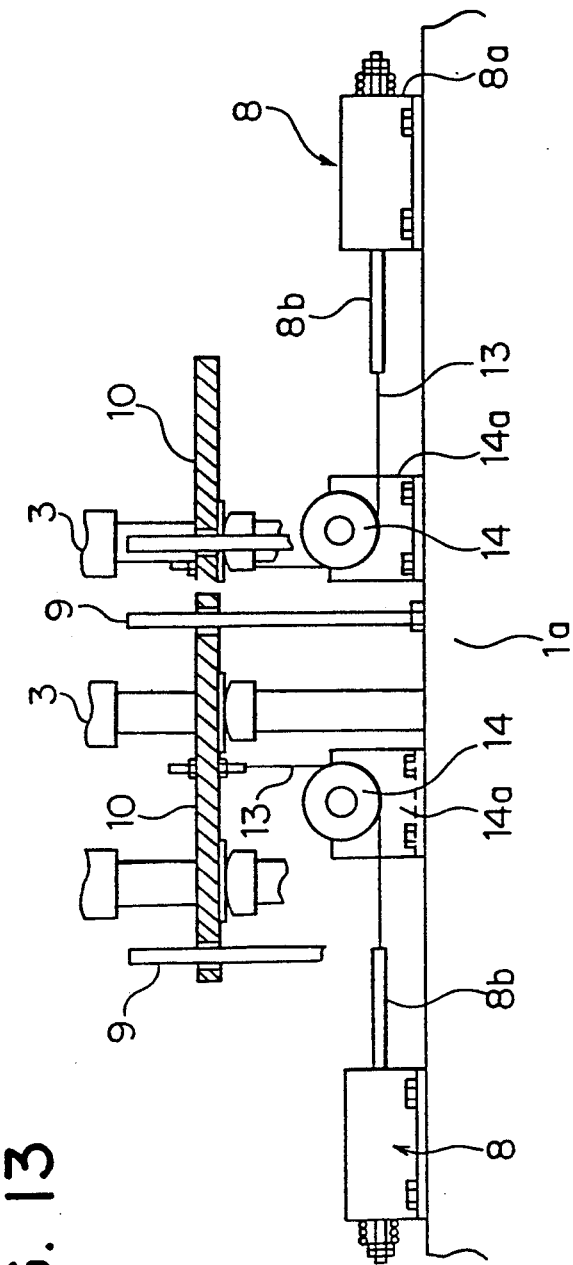
FIG. 13 is an elevational view (as seen from the front of the elevator cage) device laod detector device of FIG. 11.
Figure 14:
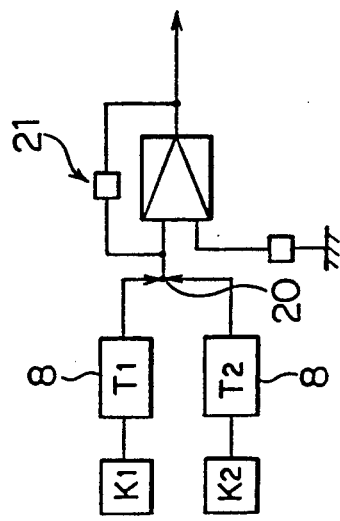
FIG. 14 is a circuit diagram of the load detector device of FIG. 11.

As shown in FIG. 12, six guide rods 9 are erected on the plate 16 in two groups of three, each group of three surrounding the triangle of respective three shackles 3. A pair of differential transformer transducers 8 are mounted on the plate 16 so as to oppose each other; the differential transformers 8 each comprise, as shown in FIGS. 12 and 13, main body 8a, and a rod-shaped magnetic shaft member 8b made of a magnetic material supported reciprocatably (i.e., axially translatably) within the main body 8a. The AC output voltage of the differential transformer transducers 8 are modified, i.e., raised and lowered, by means of electromagnetic induction. Further, the outputs of the differential transformers 8 are connected, as shown in FIG. 14, to an adder 20, the output of which is coupled to an amplifier 21. A pair of pulleys or deflector wheels 14 are rotatably supported on the vertical surfaces of the support members 14a secured on the upper surface of the upper beam 1a. Two triangular detector plates 10, through which the guide rods 9 and the shackles 3 axially translatably extend, are moved vertically with the vertical displacements or translations of the shackles 3 as seen from FIG. 11. A pair or wire ropes 13 are each connected at one end thereof to the detector plates 10, at the other end thereof to the magnetic member 8b of associated one of the differential transformers 8, the wire ropes 13 being each deflected at the middle thereof by means of the associated one of the deflector wheels or pulleys 14.

Thus, when passengers get on board the elevator cage and the cage moves downward due to the weight, the shackles 3 move relatively upward with respect to the cage, thereby compressing the springs 5a of the elastic support means 5. Further, accompanying the relatively upward movements of the shackles 3, the two detector plates 10 also move upward, respectively, so as to pull up the wire ropes 13; thus, the magnetic members 8b of the differential transformers 8 move horizontally, so that the differential transformers 8 detect the weight of the cage, respectively, on the basis of the deflections or compression (represented by K1 and K2 in FIG. 14) of the springs 5a. The anchoring members 3 are divided into two subgroups each consisting of three anchoring members forming a triangle, wherein the two detector plates 10 are translated each with one of the subgroups of anchoring members 3. The detection values of the differential transformers 8 are outputted to the adder 20, which outputs the result of the addition to the amplifier 21.

Next, another embodiment of this invention is described by reference to FIGS. 15 and 16, which is simialr to the load detector device of FIGS. 11 to 14, except that a single differential transformer detects the average of the displacements of the two detector plates. Thus, in contrast to the load detector device of FIGS. 11 through 14, only one differential transformer transducer 8 is provided on the plate 16. To the front end of the magnetic member 8b of the differential transformer 8 is attached a horizontally lying L-shaped support plate 18a, to the upper horizontal surface of which is rotatably supported a pulley 18. The two ends of a sole wire rope 13 are connected to the lower surface of the two detector plates 10, respectively, the middle portion of the wire rope 13 being wound around the pulley 18 and deflected by the two pulleys or deflector wheels 14 (see FIGS. 15 and 16), respectively, to be directed upward toward respective detector plates 10.

As described above, according to this embodiment, on the magnetic shaft member 8b the pulley 18 is rotatably supported via the support member 18a, and, in addition, both ends of the sole wire rope 13 wound around the pulley 18 are coupled to the lower surfaces of the detector plates 10, respectively, being deflected thereto via the deflector pulleys 14. Thus, it is possible to take the average of the displacements of the plurality of detector plates 10 by means of the pulley 18, and hence to detect the average of the deflections (K1 and K2) of the respective springs 5a by means of the single differential transformer 8. Thus, the adder 20 can be dispensed with, and the number of parts can be reduced. Further, since the structure of the load detector device can be simplified, the installment and the maintenance thereof can be facilitated. Furthermore, since the number of parts can be reduced, the installemnt space can be reduced.

Figure 15:
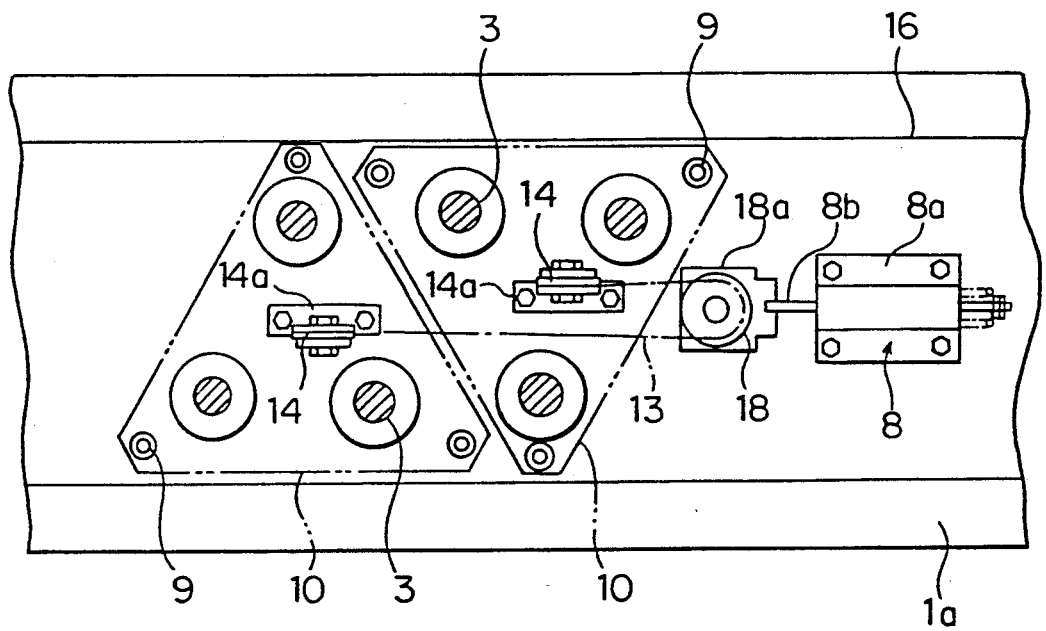
FIG. 15 is a plan view showing another embodiment of a load detector device accroding to this invention which comprises a pair of detector plates.
Figure 16:
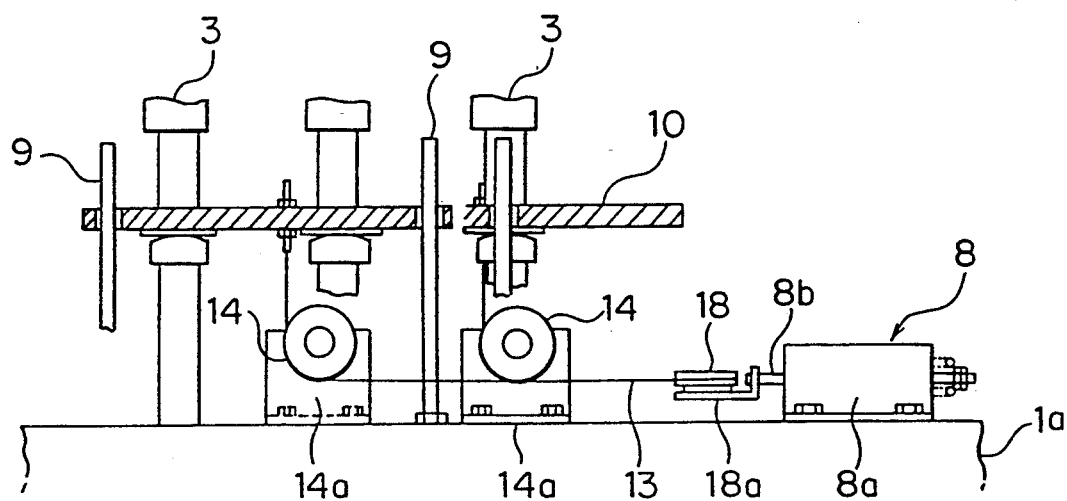
FIG. 16 is an elevational view similar to that of FIG. 13, but showing the load detector device of FIG. 15.
Figure 17:
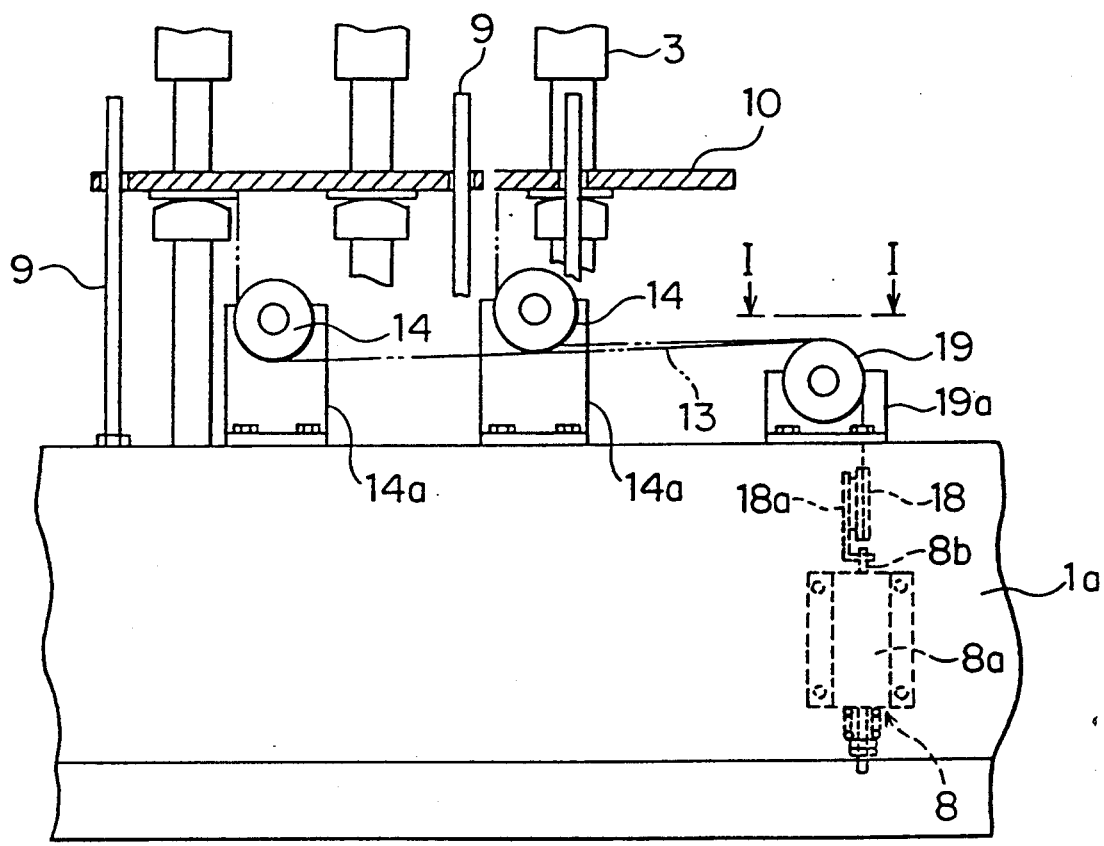
FIG. 17 is an elevational view similar to that of FIG. 16, but showing another load detector device according to this invention comprising a pair of detector plates.
Figure 18:
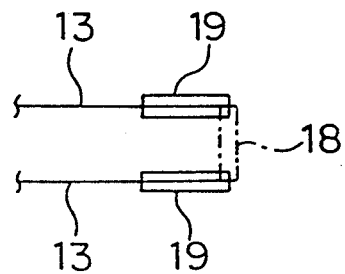
FIG. 18 is a top view of a portion of the load detector device of FIG. 17, as seen from line I—I of FIG. 17.

FIGS. 17 and 18 show another embodiment according to this invention similar to that of FIGS. 15 and 16, wherein, however, the single differential transformer 8 is mounted on the interior side surface of an H-shaped cross-sectional upper beam 1a. Thus, the two halves of the wire rope 13, which are directed vertically upward, the middle portion of the wire rope 13 being wound around the pulley 18 rotatably mounted to the support member 18a attached to the magnetic shaft member 8b of the transformer 8, are deflected into a horizontal direction (toward left in FIG. 17) by means of a pair of deflector wheels or pulleys 19; further, they are deflected upward by means of a pair of deflector wheels or pulleys 14, to be connected at the two ends thereof to the lower surface of the respective detector plates 10.

This embodiment is expected to have similar meritorious effects as the above embodiment of FIGS. 15 and 16. Further, since the differential transformer 8 is accomodated within the upper beam 1a, the upper surface of the upper beam 1a is available as footing area during the installation and maintenance operations, and the installation space may further be reduced.

Figure 19:
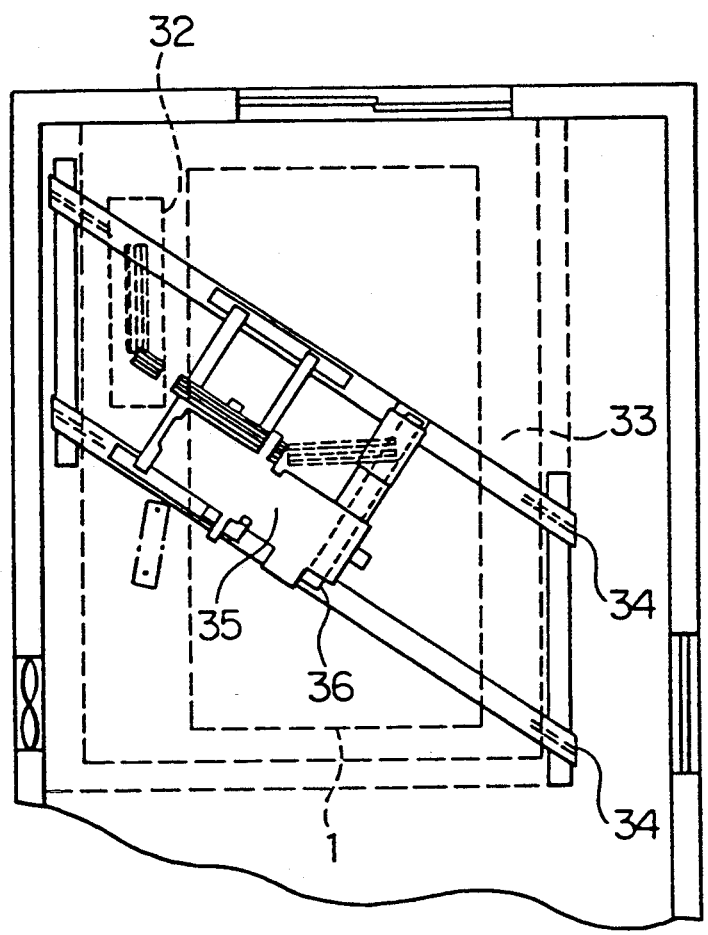
FIG. 19 is a top view of a machine room at the top of the hoist way of an elevator device.
Figure 20:
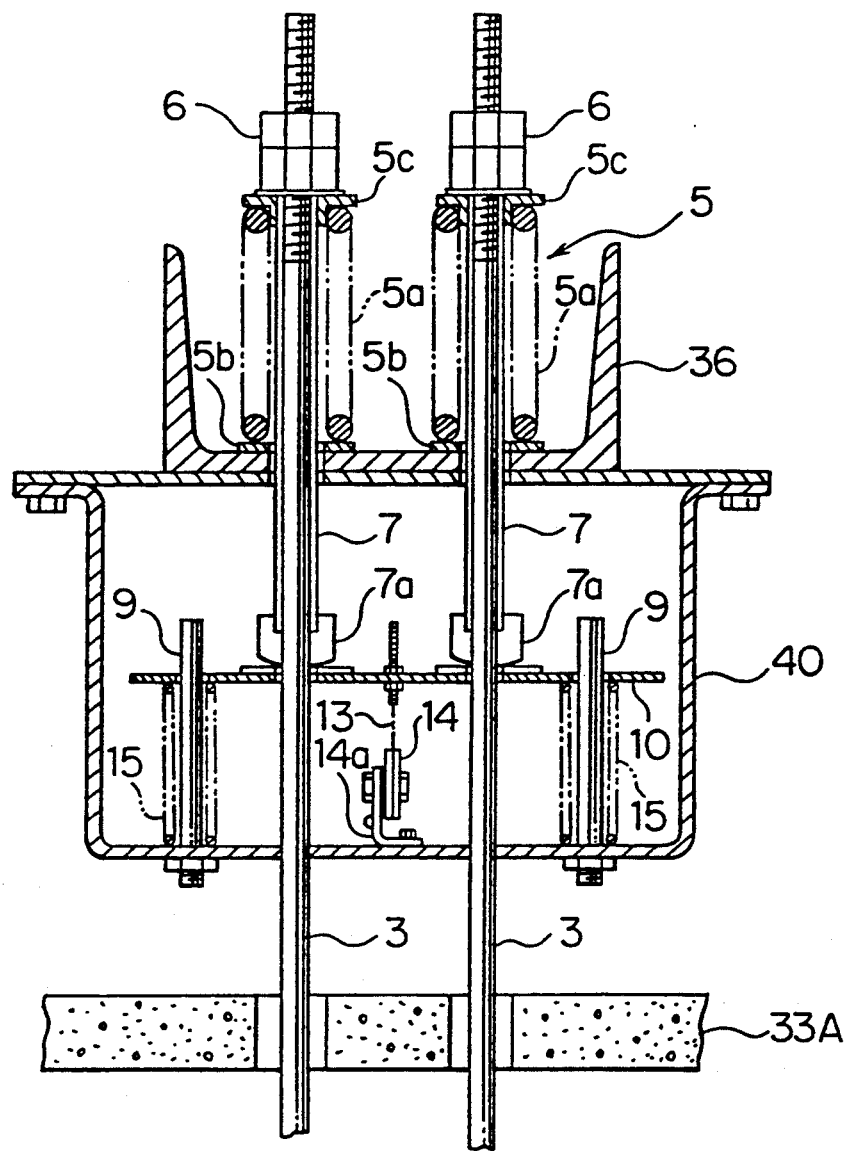
FIG. 20 is a transversal sectional view of the rope anchoring beam disposed in the machine room of FIG. 19, showing another load detector device according to this invention.
Figure 21:
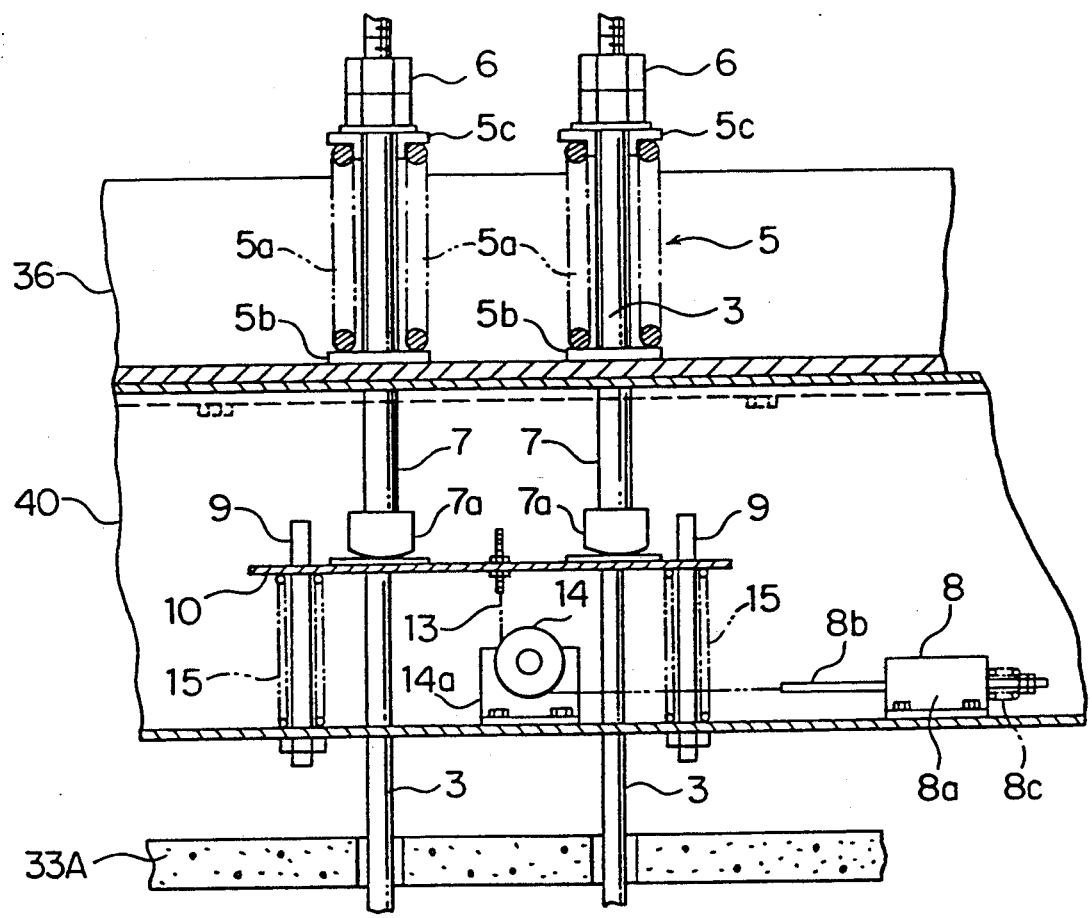
FIG. 21 is a longitudinal sectional view showing a side view of the load detector device of FIG. 20 as seen from right to FIG. 20.

FIGS. 19 through 21 show another embodiment of this invention, wherein the laod detector device is disposed in the machine room at the top of the hoist way of the elevator.

As shown in FIG. 19, a balancing weight (counterweight) 32 is disposed to a side of the elevator cage 1 in the hoist way of the elevator. On the floor of machine room 33 at the top of the hoist way, there are disposed a pair of machine support beams 34, on which a winding machine 35 is disposed. Further across the pair of machine support beams 34 spans, as shown in FIG. 19, a rope anchoring beam 36.

In FIGS. 20 and 21, shackle rods (anchoring members) 3, to the bottom ends of which the main ropes are connected, extend through the through-holes formed in the floor 33A of the machine room 33 shown in FIG. 19, to be anchored to the rope anchoring beam 36 via the elastic support means 5. The load detector assembly is accomodated within the housing 40 attached to the bottom flat of the rope anchoring beam 36. The bottom flat of the U-shaped cross sectional rope anchoring beam 36 serves as the rope anchoring plate.

To described in greater detail, the shackle rods (rope anchoring members) 3 vertically translatably extend through the bottom horizontal flat of the top anchoring beam 36, a housing 40 attached to the bottom flat of the rope anchoring beam, and the through-holes in the floor 33A. As shown in FIG. 20, shackle pipes (activator members) 7, each axially translatably fitted around a shackle rod (anchoring member) 3, extend translatably through the bottom flat of the rope anchoring beam 36 and the top flat of the housing 40. Further, elastic support means 5 comprises, for each one of the shackle rods 3, bottom and top annular spring seats 5b and 5c, and shackle springs (helical compression springs) 5a having sufficient deflection or compression margins interposed between the top and the bottom spring seats 5c and 5b. The shackle springs 5a elastically urge upward the shackle rods 3 via the top spring seats 5c and the double nuts 6 fixed onto the top threaded portion of the shackle rods 3. The springs 5a function as buffers for the impulses applied to the shackle rods 3 during the vertical movement thereof. Double nuts 6 screwed onto the shackle rods 3 let the top springs seats 5c bear on top of the shackle pipes 7. A spherical seat 7a is fixedly secured to the bottom end of each one of the shackle pipes (activator members) 7.

The housing 40 is attached to the lower surface of the rope anchoring beam 36, to be interposed between the rope anchoring beam 36 and the floor 33A. The shackle assemblies, each consisting of a shackle rod 3 and a shackle pipe 7 disposed therearound, extend axially translatably through the housing 40. Further, on the bottom flat of the housing 40 are erected four studs 9 at the four corners of a rectangle. The four studs 9 extend vertically translatably through an area near the corners of a rectangular detector plate 10. Between the detector plate 10 and the bottom flat of the housing 40, helical springs 15 are disposed to surround the studs 52. The springs 15 elastically urge upward the detector plate 10 such that the detector plate 10 bears on the spherical seats 7a screwed onto the bottom end of the shackle pipes 7. The lower surfaces of the spherical seats 7a abutting the detector plate 10 are formed into spherical surfaces. The spherical seats 7a move downward with the downward movement of the shackle assemblies 3 and 7, to lower the detector plate 10.

Below the detector plate 10 within the housing 40, a pulley 14 is rotatalby mounted to a vertical side surface of a substantially L-shaped support member 14a fixed on the bottom flat of the housing 40. Further, a differential transformer transducer (load detector) 8 is mounted on the bottom flat of the housing 40. The differential transformer 8 comprises, as shown in FIG. 21, a main body 8a, a magnetic shaft member 8b consisting of a magnetic material and supported translatably by the main body 8a, and a spring 8c which is fitted around one end of the magnetic shaft member 8b via a nut so as to urge elastically the shaft 8b away from the pulley 14. The transformer 8 detects the weight or load of the elevator cage on the basis of the horizontal movement of the shaft 8b. A wire rope 13 is connected, as shown in FIG. 21, at one end thereof to the center of the lower surface of the detector plate 10; the other end of the wire rope 13 is connected to the front end of the shaft 8b of the differential transformer 8, the wire rope 13 being deflected by means of the pulley or deflector wheel 14 at the middle portion thereof.

Thus, when the main ropes connected to the bottom ends of the shackle rods 3 move downward with the downward movement of the cage to lower the shackles 3, the shackle pipes 7 move downward with the shackle rods 3; thus, the spherical seats 7a push downward on the detector plate 10 to compress the springs 15. As a result, the wire rope 13, which has been under tension, is relaxed, to allow the horizontal movement of the magnetic shaft 8b of the transformer 8 away from the deflector wheel or pulley 14 (toward right in FIG. 21), wherein the weight or load of the cage is detected on the basis of the translation of the magnetic shaft member 8b.

As described above, according to this embodiment, the shackle assemblies consist of the shackle pipes 7 and the shackle rods 3, and the load detector device is disposed below the rope anchoring beam 36. Further, the shackle pipes 7, to which the spherical seats 7a bearing on the detector plate 10 is fixed, are vertically translatable on the shackle rods 3. Thus, even when the lengths of the main ropes are adjusted by tightening or loosening the double nuts 6 to move the shackle rods 3 vertically, it is not necessary to disassemble the load detector device. Hence, the efficiency of the maintenance and inspection operations can be greately enhanced. Further, since the main portion of the load detector device consists of the detector plate 10, the differential transformer 8, and the wire rope 13, the load detector device can be rendered small-sized and inexpensive. Furthermore, since the load detector device is accomodated within the housing 40, the attachment of dusts to the spherical seats 7a, the pulley 14, and the wire rope 13 can be prevented, thereby ensuring high maintenace quality and stability. Still further, since shackle springs 5a having enough margin in the deflection lengths thereof are utilized, large tensions, which may act on particular ones of the main ropes due to the bad tension adjustement of the tensions of the main ropes, can be born by such main ropes without failure. Further, since the wire rope 13 and the differential transformer (load detector) 8 are disposed to the side of the detector plate 10 to which the detection movement the detector plate 10 is directed, the shaft 8b of the differential transformer 8 is not pulled by the wire rope 13 with undue strain. Hence the failure of the differential transformer 8 is prevented.

In the case where the number of main ropes is large, the embodiment of FIGS. 20 and 21 may be modified to have two detector plates 10 instead of one. In such case, the structure as shown in FIGS. 15 and 16 may be adopted with obviously necessary modifications. Then, a single differential trnasformer transducer 8 is disposed on the bottom flat of the housing 40 as shown in FIGS. 20 and 21. As shown in FIGS. 15 and 16, however, the magnetic shaft member 8b of the transformer is provided with a pulley 18 rotatably mounted on the support member 18a fixed to the shaft member 8b, so that a wire rope 13 wound around the pulley 18 at the middle portion thereof is deflected by a pair of deflector wheels 14 to be connected at the two ends thereof to the bottom surface of the respective one of the two detector plates 10. Thus, the differential transformer 8 detects the average displacement of the two detector plates 10.

Figure 22:
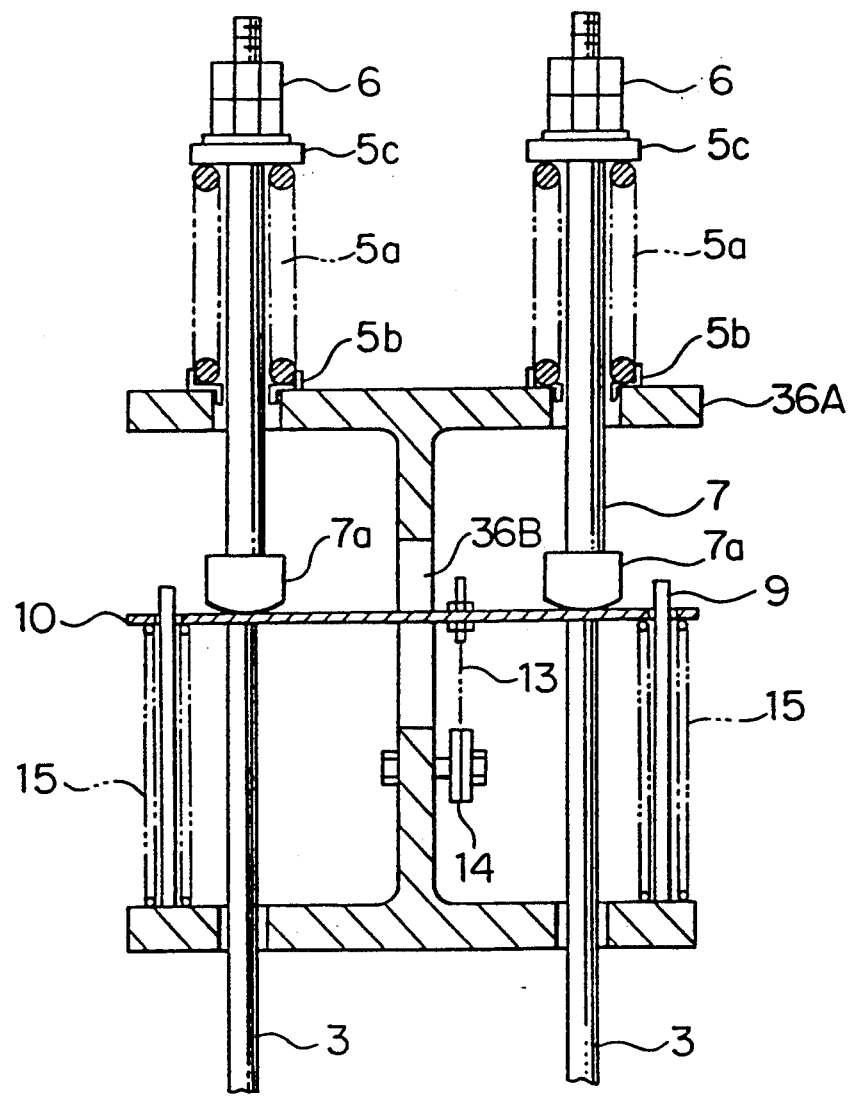
FIGS. 22 and 23 are views similar to that of FIGS. 20 and 21, respectively, but showing another load detector device according to this invention.
Figure 23:
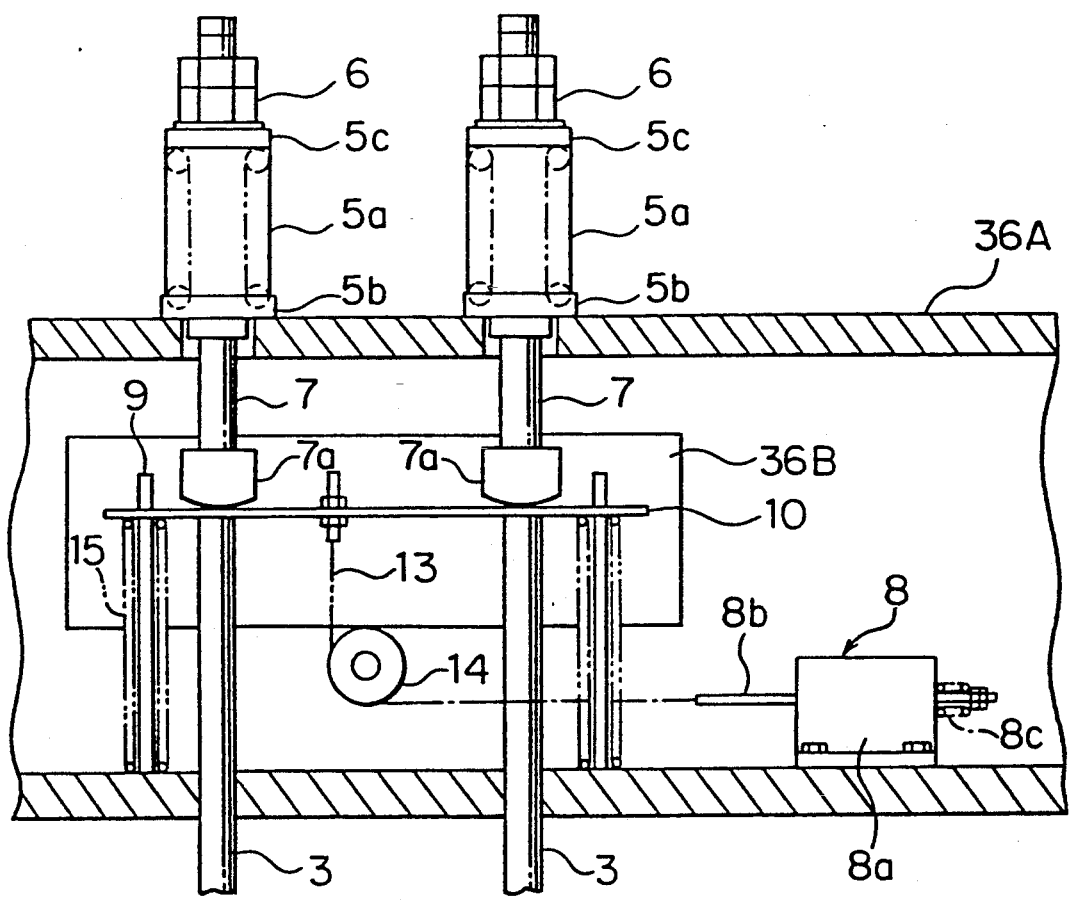

FIGS. 22 and 23 show another embodiment according to this invention, which is similar to that of FIGS. 20 and 21. A rope anchoring beam 36A consisting of an H-shaped cross sectional steel beam is disposed horizontally across the machine supports 34 (see FIG. 19); through the vertical wall of the rope anchoring beam 36A is formed a rectangular aperture 36B as shown in FIG. 23. A detector plate 10 is disposed within the rope anchoring beam 36A to extend horizontally across the aperture 36B. Further, a deflector wheel or pulley 14 is rotatably mounted on the vertical wall of the rope anchoring beam 36A, while the differential transformer 8 is disposed on a bottom flange of the rope anchoring beam 36A (see FIG. 23).

This embodiment is expected to have similar meritorious effects as the above embodiment of FIGS. 20 and 21; further, since the the load detector device is disposed within an H-shaped cross sectional rope anchoring beam 36A, the installment space can be reduced.

As described above, according to the embodiments of FIGS. 19 through 23, the load detector device for an elevator comprises: a machine room disposed at the top portion of a hoist way of the elevator; a rope anchoring beam disposed above the floor of the machine room; vertically trasnlatable shackle rods (rod-shaped anchoring members) supported elastically to the rope anchoring beam and extending through the floor of the machine room to be connected to the ends of the main ropes suspending the elevator cage; shackle pipes (activator members) fitted translatably around the shackle rods; a detector plate disposed below the rope anchoring beam and moving vertically in synchrony with the shackle rods and the shackle pipes; and a differential transformer disposed below the detector plate so as to detect the load of the elevator cage on the basis of the movement of the detector plate. Thus, the working efficiency can be improved and the cost can be reduced.

Figure 24:
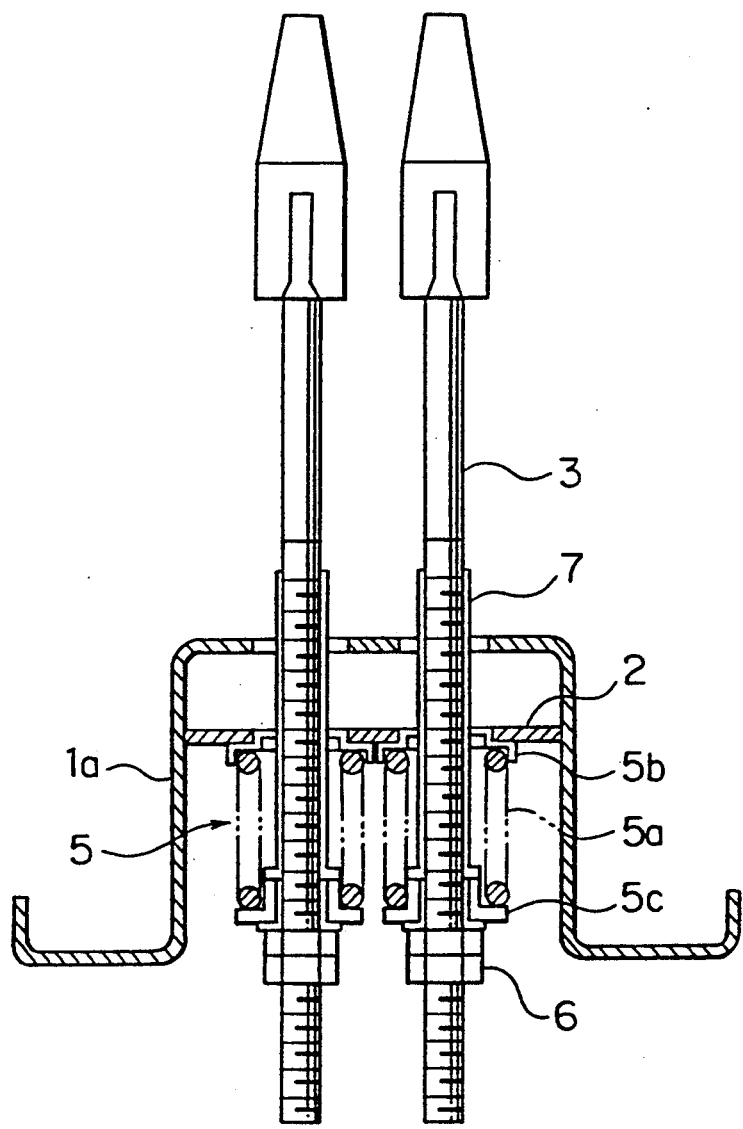
FIG. 24 is a transversal sectional view of the upper beam of an elevator cage, showing an embodiment of a tension indicator device for an elevator according to this invention.
Figure 25:
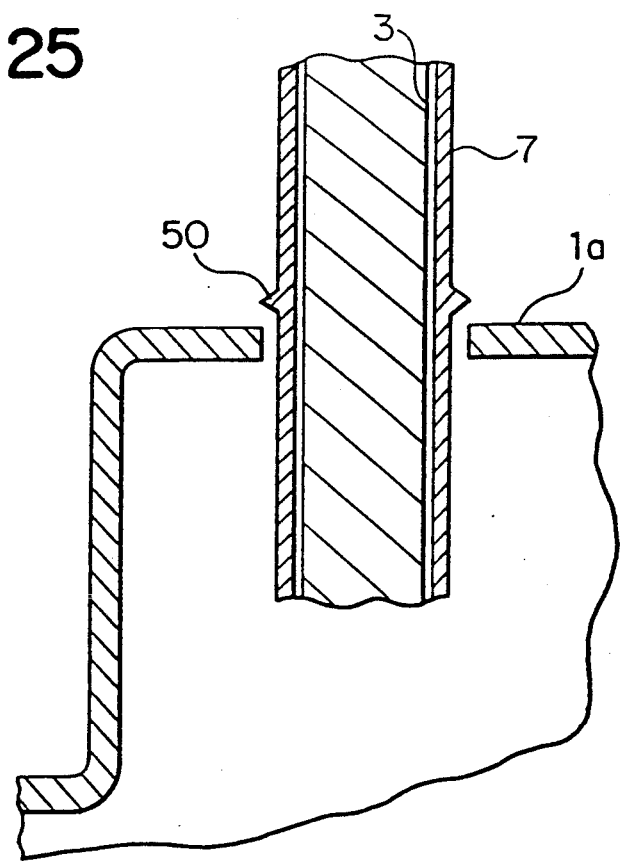
FIG. 25 is an enlarged sectional view showing an essential portion of a tension indicator device for an elevator of FIG. 4.

FIGS. 24 and 25 show another embodiment of this invention, wherein the indiviual tensions of the main ropes suspending the elevator cage are indicated by marks formed on cylindrical members fitted around the shackle rods (anchoring members).

In FIG. 24, the elevator cage (not shown) fixed to the bottom of the upper beam 1a is suspended elastically from the main ropes (not shown) via the shackle rods 3 and the elastic support means 5. An anchoring plate 2 spans horizontally across the interior upper portions of the opposing walls of the upper beam 1a. Through the rope anchoring plate 2 are formed through-holes which are respectively in axial registry with the plurality of through-holes formed in the top flat of the upper beam 1a. To these holes formed through the anchoring plate 2 there are fitted respective annular top spring seats 5b, on which the helical compression springs 5a bear at the top thereof, to extend vertically downward to the bottom spring seats 5c opposing the top springs seats 5b. The helical compression springs 5a, supported by the shackle rods 7 via the bottom spring seats 5c, urge elastically upward the anchoring plate 2, thereby elastically supporting the elevator cage.

Shackle rods (anchoring members) 3 extend vertically translatably through the upper beam 1a, the rope anchoring plate 2, the top spring seats 5b and the bottom spring seats 5c. Fitted axially translatably around the shackle rods 3 are detector cylinders 7 which extend translatably through the upper beam 1a, the rope anchoring plate 2, and the top spring seats 5b, to be supported at the bottom end thereof on the bottom spring seats 5c in contact therewith. Double nuts 6 are screwed onto the bottom threaded portion of the shackle rods 3, to about on the bottom spring seats 5c, thereby supporting the bottom spring seats 5c on the shackle rods 3. The nuts 6 are screwed or unscrewed, so as to adjust the tensions of the main ropes connected to the top ends of the shackle rods 3.

As shown clearly in FIG. 25, a mark 50 is formed on each one of the detector cylinders 7. The mark 50, or annular projection, is formed on the outer side surface of the detector cylinder 7 just above the upper surface of the upper beam 1a. The mark 50 indicates clearly for the operator, as shown in FIG. 25, the amount of deflection or compression of the spring 5a, namely, the tension of the main rope associated therewith, by means of the separation thereof from the upper surface of the upper beam 1a. Namely, when a shackle rod 3 moves upward compressing the spring 5a associated therewith, the mark 50 rises with respect to the upper beam 1a to increase the separation thereof from the upper surface of the upper beam 1a, the operator thereby recognizing easily that the tension of the main rope connected to the shackle rod 3 in question is large. On the other hand, when the shackle rod 3 moves down to return the spring 5a to the original state, the mark 50 is lowered to decrease the separation thereof from the upper surface of the upper beam 1a, the operator thereby easily recognizing that the tension of the associated main rope is small.

Thus, when the tensions of the main ropes are to be adjusted, the operator, on the basis of the successive measurements of the separations effected by means of a measurement scale such as a triangle scale, etc., adjusts the projection lengths of the shackle rods 3, i.e., the separations of the marks 50 from the upper surface of the upper beam 1a, by turning the nuts 6, thereby ensuring the uniformity of the tensions of the plurality of the main ropes to which the shackle rods 3 are connected at the top ends thereof.

As described above, according to this embodiment of the invention, the marks 50, which indicate, by means of the separations thereof from the upper surface of the upper beam 1a, the tensions of the main ropes, are formed in the form of projections on the detector cylinders 7. Hence, the tensions of the associated main ropes can be measured with extreme facility without utilizing a spring-type balance, thereby greatly simplifying the tension adjustment operations of the main ropes. Further, longer life of the elevator device and the prevention of the oscillations of the elevator cage are ensured.

Figure 26:
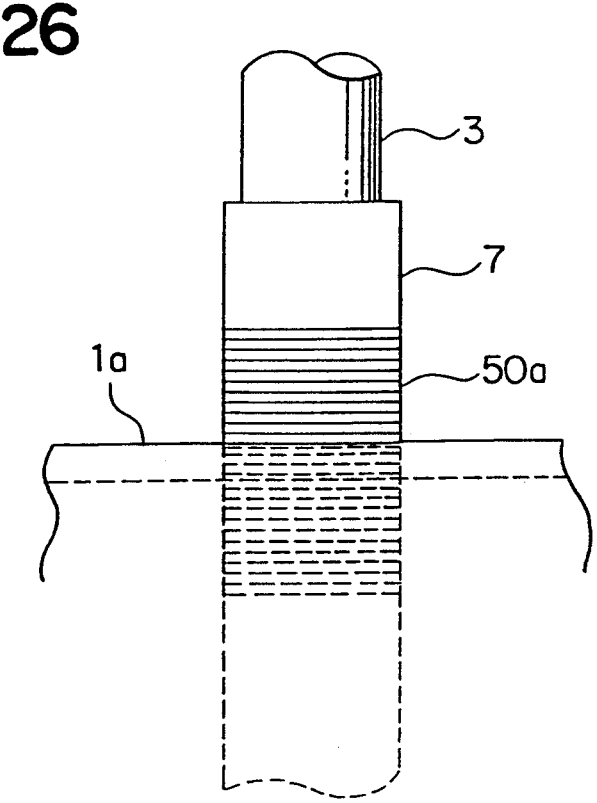
FIG. 26 is a view of the graduation which may be used instead of a mark of FIG. 25.

Next, FIG. 26 shows another embodiment of this invention similar to that of FIGS. 24 and 25. In the case of this embodiment, however, a graduation 50a is formed on each one of the detector cylinders 7 as the tension indicator mark. The graduation 50A consists of a multitude of parallel notches formed horizontally on the outer peripheral surface of the detector cylinder 7 in the neighborhood of the upper surface of the upper beam 1a.

This embodiment has similar functional meritorious effects as the above embodiment of FIGS. 24 and 25. In addition, since graduations 25A, which serve as measurement scales equivalent to the above-mentioned triangle scale, are formed on the detector cylinders 7, the separation measurement device such as the triangle scale can be dispensed with, thereby further enhancing the simplicity and the facility of the tension adjustmeent oprations.

Figure 27:
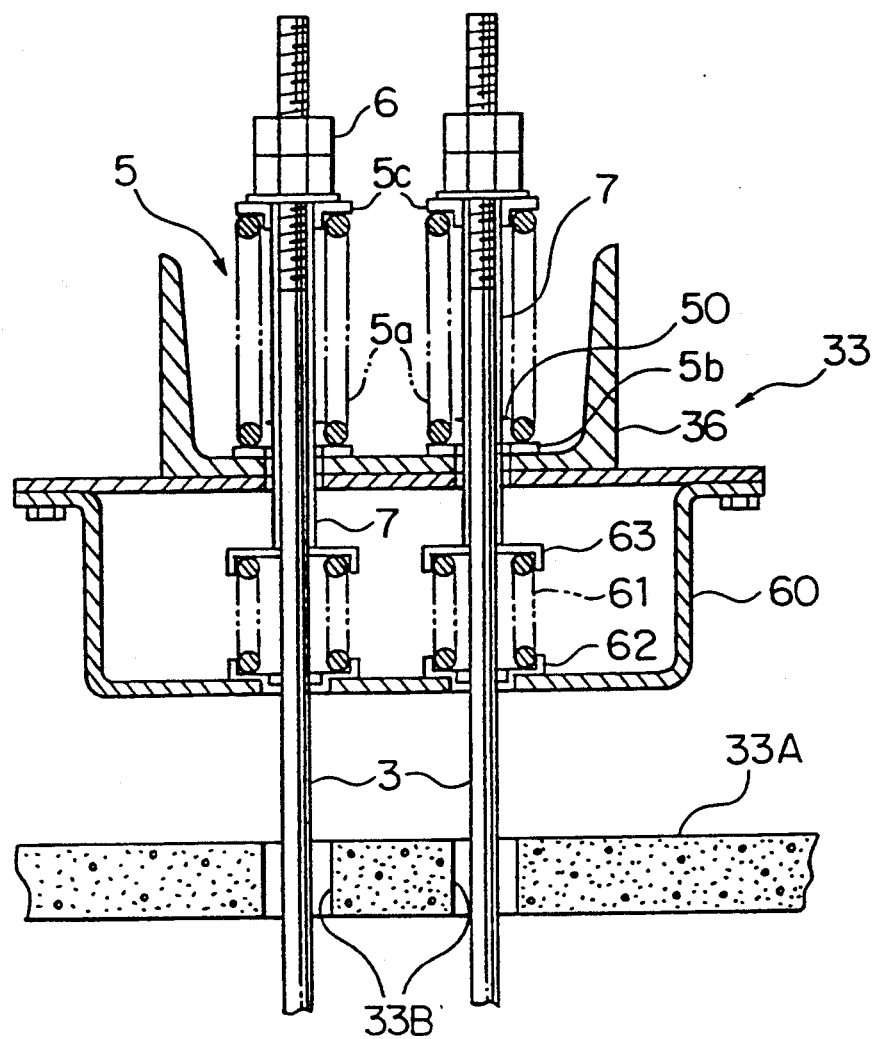
FIG. 27 is a transversal sectional view of a rope anchoring beam in the machine room, showing another tension indicator device according to this invention.

Next, FIG. 27 shows an enbodiment wherein the rope-tension indicating device according to this invention is applied to the 2:1 roping mode rope-type elevator device. In FIG. 27, the main ropes (not shown) suspending the elevator cage (not shown) in the hoist way are connected to the bottom ends of the shackle rods 3, which are elastically supported, via the elastic support means 5, on the rope anchoring beam 36 disposed in the machine room 33. A plurality of through-holes 33b are formed through the floor 33A of the machine room 33. A support frame 60 constituting a box-shaped housing is attached to the bottom flat of the U-shaped cross-sectional rope anchoring beam 36. Through the top and bottom flats of the support frame 60 there are formed through-holes in axial registry with the through-holes 33B and those in the bottom flat of the anchoring beam 36. Annular bottom spring seats 62 are each fitted to one of the holes formed through the bottom flat of the support frame 60. Helical compression springs 61, each disposed around one of the shackle rods 3 to bear on the bottom spring seat 62 at the bottom end thereof, urge elastically upward the detector cylinders 7 via the top spring seats 63 opposing the bottom spring seats 62.

Through the bottom flat of the rope anchoring beam 36 are formed a plurality of holes in registry with the holes formed through the top flat of the support frame 60. The bottom spring seats 5b of the elastic support means 5 are attached on top of the peripheral portions of these holes formed through the rope anchoring beam 36. Compression springs 5a bearing on the bottom spring seats 5b at the bottom ends thereof urge elastically upward the shackle rods 3 via top spring seats 5c and the double nuts 6 screwed onto the threaded portion of the shackle rods 3.

Shackle rods 3 extend through the hole 33B in the floor 33A, the holes in the bottom flat of the support frame 60, the bottom and top spring seats 62 and 63 within the frame 60, the holes in the top flat of the support frame 60, and the bottom and the top spring seats 5b and 5c of the elastic support means 5. Fitted translatably around the shackle rods 3 are detector cylinders 7, which extend through the top spring seats 5c, the bottom spring seats 5b, and the holes through the bottom flat of the rope anchoring beam 36, to be in contact with and supported by the top spring seats 63 for the springs 61 within the frame 60. Screwed onto the threaded top portion of the shackle rods 3 are the nuts 6, which abut on the tope spring seats 5c therebelow so as to prevent the dropping-out of the shackle rods 3.

Tension indicating marks 50 are formed in the form of projections on the outer side surface of the detector cylinders 7 just above the bottom flat of the rope anchoring beam 36. These marks 50 have the same function as described above by reference to FIGS. 24 and 25. Thus, it is evident that this embodiment has the same functional effects as the embodiments described above.

By the way, in the case of this embodiment, the marks 50 are formed on the detector cylinders 7 in the form of projections. However, graduations in the form of a multitude of parallel notches formed on the detector cylinders 7 may have the same functional effects. Further, the tension indicating device according to this invention may be applied, with the same functional effects as in the case of the above embodiments, to the compensation ropes for adjusting the differences between the weights on the side of the cage and on the side of the counterweight.

As described above, according to the embodiments of FIGS. 24 through 27, there are provided reference marks for indicating the individual tensions of the main ropes on the basis of the separations thereof from the beam, such as the upper beam 1a of the elevator cage as shown in FIG. 24, or the rope anchoring beam 36 disposed within the machine room 33 as shown in FIG. 27. Thus, the adjustment operations of the tensions of the main ropes can be simplified and facilitated, the tensions of the ropes can be made precisely uniform and equal to each other, and the longer operating life of the elevator device and the prevention of the oscillations of the cage are ensured.

While description has been made of the particular embodiments of this invention, it will be understood that many modifications may be made without departing from the spirit thereof. The appended claims are contemplated to cover any such modifications as fall within the true spirit and scope of this invention.

What is claimed is:

1. A load detector device for an elevator for detecting a load of an elevator cage which is suspended within a hoist way by means of ropes, comprising:

rod-shaped anchoring members connected at one end thereof to the ropes and inserted at the other end thereof axially translatably through an anchoring plate;

elastic support means for elastically supporting said anchoring members to the anchoring plate, said elastic support means including, for each one of said anchoring members, a resilient member bearing at one end thereof on the anchoring plate and at the other end thereof on an annular seat translatably fitted on the inserted end portion of the anchoring member, the axial translation of the annular seat away from the anchoring plate being limited by an adjustable fixing means axially adjustably fixed onto the inserted end of the anchoring member;

activator members each surrounding an anchoring member and bearing at one end thereof on the annular seat fitted on the anchoring member, to extend axially translatably through said anchoring plate; and detector means for detecting displacements, with respect to the anchoring plate, of the ends of the activator members opposite to the ends thereof bearing on said annular seats.

2. A load detector device for an elevator as claimed in claim 1, wherein said activator members each comprise a hollow cylindrical member axially translatably fitted around one of the rod-shaped anchoring members.

3. A load detector device as claimed in claim 1, further comprising a detector plate bearing on the ends of the activator members opposite to the ends thereof bearing on said annular seats to be translated with the activator members, wherein said detector means detects a displacement of said detector plate with respect to the anchoring plate.

4. A load detector as claimed in claim 3, wherein said detector means comprises:

a differential transformer transducer fixedly mounted with respect to the anchoring plate, the output of the differential transformer transducer being modified by means of a translation of a magnetic shaft member thereof; and a wire rope means connected to one end thereof to the magnetic member of the differential transformer transducer and at the other end thereof to said detector plate, the wire rope transmitting the displacement of the detector plate to the magnetic member of the differential transformer transducer.

5. A load detector device for an elevator for detecting a load of an elevator cage which is suspended within a hoist way by means of ropes, comprising:

rod-shaped anchoring members connected at one end thereof to the ropes and inserted at the other end thereof axially translatably through an upper beam forming part of a frame structure of the elevator cage, the anchoring members being supported on the upper beam;

a plurality of detector plates each translated with a subgroup of said anchoring members;

a differential transformer transducer including a magnetic shaft member fixedly mounted with respect to the upper beam, the output of the differential transformer transducer being modified by means of translation of the magnetic shaft member; and displacement transmission means for connecting the magnetic shaft member of the differential transformer transducer to the plurality of detector plates, so as to transmit to the magnetic shaft member the displacements of the plurality of detector plates with respect to the upper beam.

6. A load detector device for an elevator for detecting a load of an elevator cage which is suspended within a hoist way by means of ropes, comprising:

a rope anchoring beam supported on a support member disposed in a machine room situated at an end of the hoist way of the elevator;

rod-shaped anchoring members connected at one end thereof to the ropes by means of which the elevator cage is suspended, and inserted at the other end thereof axially translatably through said rope anchoring beam to be elastically supported thereon;

a plurality of detector plates disposed to the side of the anchoring beam to which the elevator cage is situated, the detector plates each being translated with a subgroup of said anchroing members;

a differential transformer transducer fixedly mounted with respect to the rope anchoring beam, the output of the differential transformer transducer being modified by means of a translation of a magnetic shaft member thereof; and displacement transmission means for connecting the magnetic shaft member of the differential transformer transducer to the plurality of detector plates, so as to transmit to the magnetic shaft member displacements of the plurality of the detector plates with respect to the anchoring beam.

7. A load detector device for an elevator as claimed in claim 5, wherein said displacement transmission means comprises:

a pulley rotatably mounted on said magnetic shaft member of the differential transformer transducer; and a wire rope wound around said pulley at a middle portion thereof to be connected at two ends thereof to distinct ones of the plurality of said detector plates, the wire rope transmitting to the magnetic shaft member the displacements of the detector plates via said pulley mounted to the magnetic shaft member.

8. A load detector device for an elevator as claimed in claim 6, wherein said displacement transmission means comprises:

a pulley rotatably mounted on said magnetic shaft member of the differential transformer transducer; and a wire rope wound around said pulley at a middle portion thereof to be connected at two ends thereof to distinct ones of the plurality of said detector plates, the wire rope transmitting to the magnetic shaft member the displacements of the detector plates via said pulley mounted to the magnetic shaft member.

9. A load detector device for an elevator as claimed in claim 7, wherein said displacement transmission means transmits to the magnetic shaft member of the differential transformer transducer a substantial average of the displacements of the plurality of detector plates.

10. A load detector device for an elevator as claimed in claim 8, wherein said displacement transmission means transmits to the magnetic shaft member of the differential transformer transducer a substantial average of the displacements of the plurality of detector plates.

11. A load detector device for an elevator for detecting a load of an elevator cage which is suspended within a hoist way by means of ropes, comprising:

a rope anchoring beam supported on a support member disposed in a machine room situated at the top end of the hoist way of the elevator;

rod-shaping anchoring members connected at the bottom ends thereof to the ropes by means of which the elevator cage is suspended, and inserted at the top ends thereof axially translatably through said rope anchoring beam to be elastically supported thereon;

a detector plate disposed below the anchoring beam to be translated vertically with said anchoring members;

activator members each surrounding an anchoring member, said activator members vertically translatably extending through said rope anchoring beam; and detector means, disposed below said detector plate, for detecting the load of the elevator cage on the basis of a translation of the detector plate.

12. A load indicator device for an elevator wherein an elevator cage is suspended within a hoist way, comprising:

rod-shaped anchoring members connected at one end thereof to the ropes and inserted at the other end thereof axially translatably through an anchoring plate;

elastic support means for elastically supporting said anchoring members to said anchoring plate, said elastic means including, for each one of the anchoring members, a resilient member bearing at one end thereof on the anchoring and at the other end thereof on an annular seat translatably fitted on the inserted end portion of the anchoring member, the axial translation of said annular seat directed away from the anchoring plate being limited by an adjustable fixing means axially adjustably fixed onto the inserted end of the anchoring member;

activator members each surrounding an anchoring member and bearing at one end thereof on said annular seat fitted on the anchoring member, to extend axially translatably through said anchoring plate; and indication means integral with said anchoring members for indicating displacements, with respect to the anchoring plate, of the ends of the activator members opposite to the ends thereof bearing on said annular seats.

13. A load indicator device as claimed in claim 12, wherein said indication means comprises marks each formed on the outer circumferential surface of one of the activator members so as to indicate separations thereof from the anchoring plate.

14. A load indicator device for an elevator wherein an elevator cage is suspended within a hoist way, comprising:

rod-shaped anchoring members connected at one end thereof to supporting ropes and inserted at the other end thereof axially translatably through an anchoring beam means to be supported elastically thereon;

hollow cylindrical detector cylinders each fitted around one of the rod-shaped anchoring members to extend vertically translatably through said anchoring beam means, each one of said detector cylidners being translated with the anchoring member around which it is fitted;

resilient means, operatively interposed between said detector cylinders and said anchoring beam means, for elastically supporting said detector cylinders; and indication means, formed on outer circumrerential surfaces of said detector cylinders, for indicating separations thereof from said anchoring beam means.

15. A load indicator device for an elevator as claimed in claim 12, wherein said indication means indicates individual tensions of the ropes by means of which the elevator cage is suspended.

16. A load indicator device as claimed in claim 14, wherein said indication means indicates individual tensions of the ropes by means of which the elevator cage is suspended.

17. A load detector device for an elevator for detecting a load of an elevator cage which is suspended within a hoist way by means of ropes, comprising:

rod-shaped anchoring members connected at one end thereof to the ropes and inserted at the other end thereof axially translatably through an anchoring plate, the inserted end of each one of the anchoring members having a male thread formed thereon;

elastic support means for elastically supporting said anchoring members to said anchoring plate, said elastic support means including, for each one of the anchoring members, a helical spring bearing at one end thereof on the anchoring plate and at the other end thereof on a nut enaging with the threaded end of the anchoring member;

activator members each surrounding an anchoring member and bearing at one end thereof on said nut fitted on the anchoring member, to extend axially translatably through the helical spring of the elastic support means and said anchoring plate; and detector means for detecting displacements, with respect to the anchoring plate, of the ends of the activator members opposite to the ends thereof bearing on said nuts.

* * * * *